United States Patent
Ace

(10) Patent No.: US 11,204,455 B2
(45) Date of Patent: Dec. 21, 2021

(54) SPECTRALLY SCULPTED MULTIPLE NARROWBAND FILTRATION FOR IMPROVED HUMAN VISION

(71) Applicant: Ronald S. Ace, Laurel, MD (US)

(72) Inventor: Ronald S. Ace, Laurel, MD (US)

(73) Assignee: Ronald S. Ace, Laurel, MD (US)

(*) Notice: Subject to any disclaimer, the term of this patent is extended or adjusted under 35 U.S.C. 154(b) by 333 days.

(21) Appl. No.: 16/320,807

(22) PCT Filed: Jul. 26, 2017

(86) PCT No.: PCT/US2017/043913
§ 371 (c)(1),
(2) Date: Apr. 3, 2019

(87) PCT Pub. No.: WO2018/022735
PCT Pub. Date: Feb. 1, 2018

(65) Prior Publication Data
US 2019/0219834 A1    Jul. 18, 2019

Related U.S. Application Data

(60) Provisional application No. 62/494,104, filed on Jul. 28, 2016.

(51) Int. Cl.
*G02B 5/22*   (2006.01)
*G02C 7/10*   (2006.01)

(52) U.S. Cl.
CPC ............ *G02B 5/223* (2013.01); *G02C 7/104* (2013.01)

(58) Field of Classification Search
CPC ................................ G02B 5/223; G02C 7/104
See application file for complete search history.

(56) References Cited

U.S. PATENT DOCUMENTS

| 3,971,065 A | 7/1976 | Bayer |
| 4,998,817 A | 3/1991 | Zeltzer |
| 7,106,509 B2 | 9/2006 | Sharp |

(Continued)

FOREIGN PATENT DOCUMENTS

| EP | 1153322 B1 | 5/2011 |
| JP | 2002540442 A | 11/2002 |

(Continued)

OTHER PUBLICATIONS

European Search Report—dated Feb. 21, 2020—EP Application No. 17835194.6.

(Continued)

*Primary Examiner* — Wen Huang
(74) *Attorney, Agent, or Firm* — Berenato & White, LLC

(57) ABSTRACT

Enhanced visual acuity is provided by one or more exceptionally narrowband absorption dyes having sharp turn-on and cut-off slopes selected to spectrally sculpt light to correct most types of colorblindness, to exaggerate color contrast vision for everyone, and/or to markedly sharpen visual focus beyond normal vision. The dyes are incorporated, for example, in sunglasses, prescription and non-prescription eyewear, window thin films and artificial light sources such as incandescent, fluorescent, and LED lightbulbs to provide improved photopic color vision, improved mesopic dim light color vision, and also sharper scotopic night vision.

18 Claims, 13 Drawing Sheets

(56) References Cited

U.S. PATENT DOCUMENTS

| | | | |
|---|---|---|---|
| 7,630,128 B2 | 12/2009 | Krieg-Kowald | |
| 8,360,574 B2 | 1/2013 | Ishak et al. | |
| 2013/0170199 A1 | 7/2013 | Athalye et al. | |
| 2014/0233105 A1* | 8/2014 | Schmeder | G02C 7/107 359/590 |
| 2016/0077361 A1 | 3/2016 | Wold et al. | |
| 2020/0096792 A1* | 3/2020 | McCabe | G02C 7/108 |

FOREIGN PATENT DOCUMENTS

| | | | |
|---|---|---|---|
| JP | 2014513315 A | 5/2014 |
| JP | 2016503196 A | 2/2016 |
| TW | 201341860 A | 10/2013 |
| WO | 2012119158 A1 | 9/2012 |

OTHER PUBLICATIONS

Japanese Office Action from Corresponding JP Application No. 2019-526194 dated Jul. 14, 2021.

\* cited by examiner

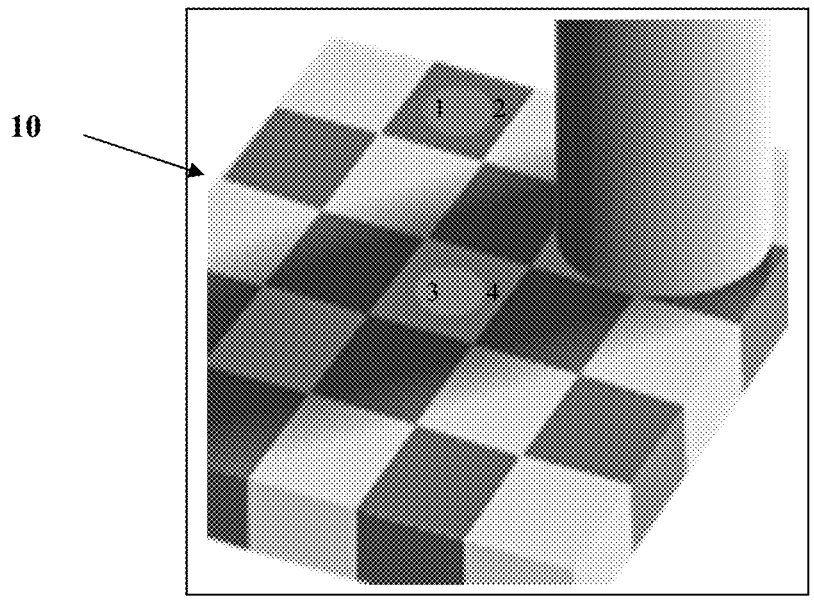

Figure 1 (PRIOR ART)

| Prevalence of color blindness | | |
|---|---|---|
| Type of colorblindness | Males | Females |
| Dichromacy | | |
| 1. Protanopia (red deficient: L cone absent) | 1.3% | 0.02% |
| 2. Deuteranopia (green deficient: M cone absent) | 1.2% | 0.01% |
| 3. Tritanopia (blue deficient: S cone absent) | 0.001% | 0.03% |
| Totals | 2.5% | 0.06% |
| Anomalous Trichromacy | | |
| 4. Protanomaly (red deficient: L cone deficient) | 1.3% | 0.02% |
| 5. Deuteranomaly (green deficient: M cone deficient) | 5.0% | 0.35% |
| 6. Tritanomaly (blue deficient: S cone defect) | 0.0001% | 0.0001% |
| Totals | 6.3% | 0.37% |
| One in 11 (9.2% of global population, 640 million) is color-impaired or colorblind. One in 15 (6.8% of the global population or, 470 million) can be narrowband optically corrected with the present invention | | |

FIG. 2 (TABLE 1)
PRIOR ART

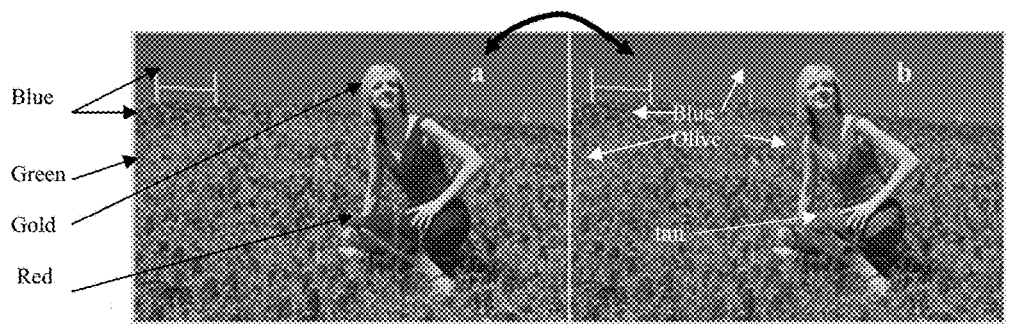
Figure 3A
Real scene
Figure 3B
Colorblind appearance
(Prior Art)
Figure 3C
Intensely bright day
Figure 3D
Dark sunglass effect
Figure 3E
Triple band present invention.
Figure 4A
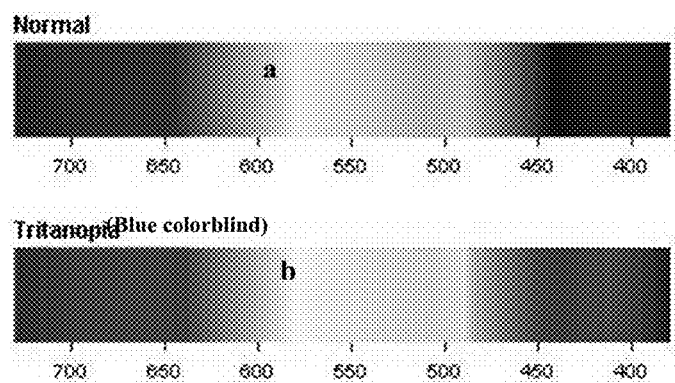
Figure 4B

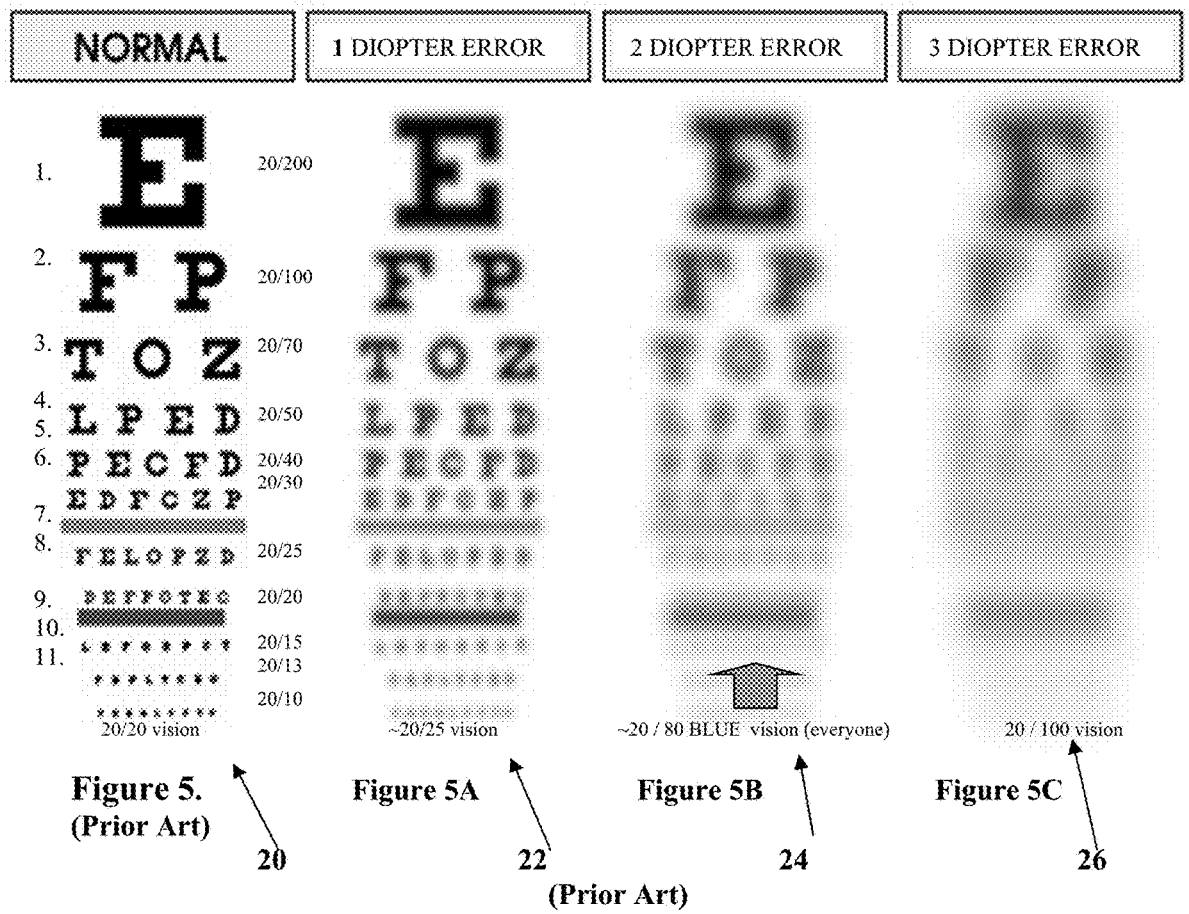

Blue　　　　　Olive　Tan

Colorblind vision

Blue　　　　　Green　Red

Normal vision

| Dark-window thin film indoor and outdoor enhanced color rendition (includes adhesive and preferred pull-down films) | | | | |
|---|---|---|---|---|
| GLOBAL: | Approx window count | Approx sq feet | Assumed one-time $10/ft2 cost | 5-10% increased productivity |
| Homes, offices, retail stores, Restaurants | 15bln | 150bln | $1500 bln | $2Tln-$4Tln / year (continuous dollar gains) |
| Cars, buses, passenger boats, trains and planes | 15 bln | 100bln | $1000 bln | large mood gains |
| | 30 bln | 250bln | $2500 bln | Over $2 trillion per year |

FIG. 9 (TABLE 2)

| Colorblind narrowband-corrected indoor continuum-lightbulbs (requiring no spectacles) | | | | |
|---|---|---|---|---|
| >470mln correctable colorblind homes | >10 bulbs per home | ~4.7 bln bulbs | = >$15 bln | better moods, and productivity |
| Workplace bulbs | 2 bulbs per colorblind indoor worker | 200mln x 2 = 400 mln units | $1.6 bln | >20 mln color-disabled new job openings |
| | | | | |

FIG 10 (TABLE 3)

"Normal" color vision

Colorblind overlapping cones

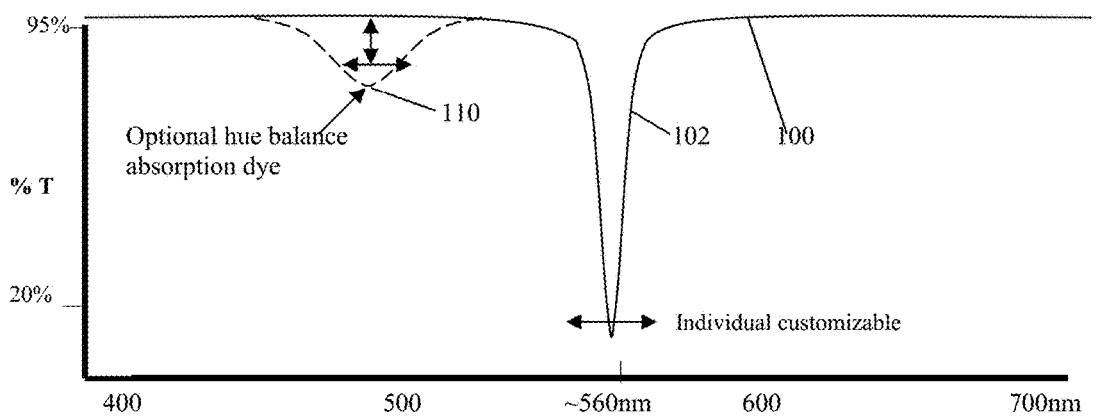
Figure 14
Figure 15
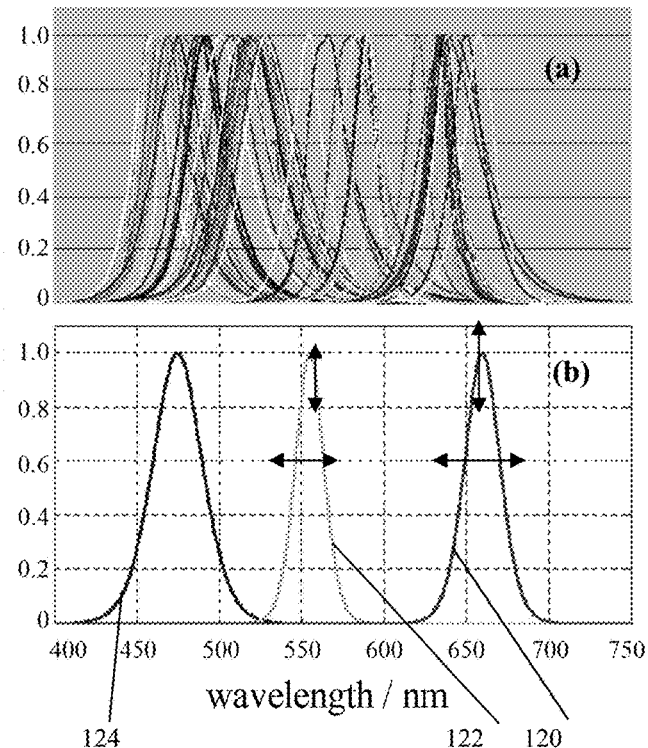
Figure 16
Prior art
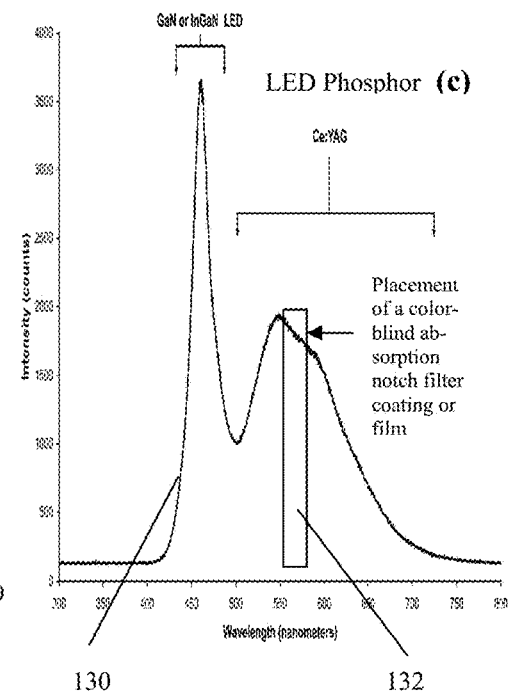
Figure 17

Additive mixing light

Subtractive mixing pigments

Prior art

A color-enhancing dye-cocktail imbibed within a plastic bifocal

A contact lens imbibed with a narrowband dye or dye-cocktail

A thin window film or lightbulb film imbibed with a narrowband absorption dye cocktail Enlarged view of a Narrowband absorption overcoated paint or ink

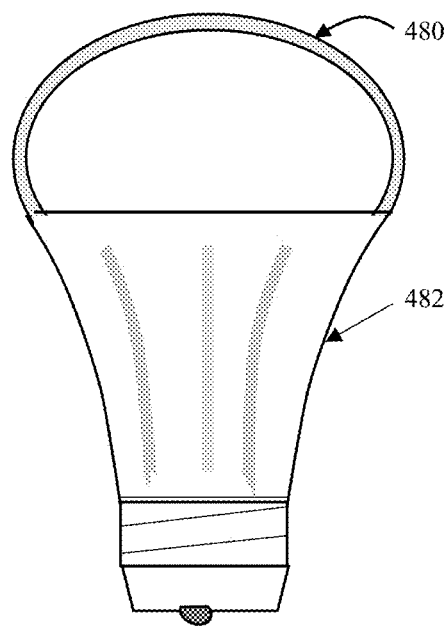
Figure 29  LED with narrowband
absorption notch lighting
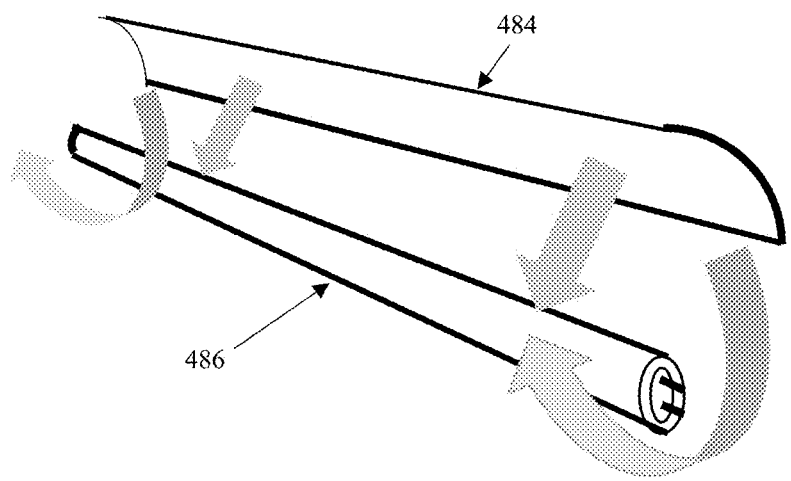
Figure 30. Fluorescent lamp with narrowband absorption
notch filter film affixed around entire length of lamp.

SPECTRALLY SCULPTED MULTIPLE NARROWBAND FILTRATION FOR IMPROVED HUMAN VISION

CROSS-REFERENCE TO RELATED APPLICATIONS AND CLAIM TO PRIORITY

This application is a national stage application of International Application No. PCT/US2017/043913 filed Jul. 26, 2017, which claims the benefit of U.S. Provisional Application No. 62/494,104, of Ronald S. Ace, filed Jul. 28, 2016, the entire full color disclosure of which is hereby incorporated herein by reference and to which priority is claimed.

FIELD OF THE INVENTION

The present groundbreaking human vision invention relates, in part, to methods and apparatus that broadly corrects most types of colorblindness for hundreds of millions of colorblind people and especially corrects hazardous vehicular highway windshield colorblindness; imparts enhanced color vision to prescription and non-prescription spectacle or contact lenses; and can even create unparalleled better than "perfect 20/20" sunglass vision. The invention further relates to stunning outdoor-viewing exaggerated full-spectrum color vision through thin film-covered building windows while simultaneously rendering dramatically color-enhanced daylight indoor window illumination—both vision effects resulting in surprisingly elevated moods and impressively higher workforce economic productivity. The present invention further relates to unique indoor filtering of artificial light to correct indoor colorblind illumination; the ability of full-spectrum filter artificial light sources to improve moods and markedly increase workforce productivity; improve digital color cameras and digital displays; and produce higher color-contrast inks and paints. To accomplish these things, the invention widely incorporates combining rare and exceptionally narrowband angle-insensitive absorption dyes to achieve the array of foregoing unprecedented objects and features. Prototype colorblind clinical trials have verified the effectiveness of the present invention for colorblindness.

BACKGROUND OF THE INVENTION

Every person—even those with naturally "perfect 20/20 vision" or those whose vision is optically corrected to perfect 20/20 vision—unknowingly suffers as much as 2 diopters of blurry chromatic aberration in the blue and red parts of the spectrum. In laymen's terms, a person with so-called perfect 20/20 vision suffers as much as 2 diopters of disabling blur under blue light, as would be seen if a standard eye-chart were illuminated only with deep blue 400 nm light. Two diopters of blue blur equates to an inability to read the $3^{rd}$ line (~20/80 vision) of an 11-line standard eye-chart. Such unavoidable natural chromatic aberrations, inherent in every human eye, manifest as blurry color halos surrounding the otherwise sharply focused images which dominate human vision in the peak green-yellow part of the spectrum. Eye doctors write their white light corrective prescriptions based on peak green-yellow spectral illumination, yet blurred color halos caused by chromic aberrations always surround sharply focused images, and these actually limit human vision to so-called "perfect 20/20" vision. Certain embodiments of the present invention can overcome universal chromatic distortion.

Human vision remains a profound wonder, and is only partially understood by scholars. It incorporates elaborate eye physical optics (lenses) plus five photosensitive sensors (super sensitive broadband colorblind rods, far less sensitive red, green, and blue cone receptors, and ganglions) all sending a labyrinth of electrical signals for even more elaborate processing in many parts of the brain, not one central vision processing center. Moreover, the eye's several light detectors exhibit widely different spectral threshold turn-on sensitivities. Colorblind (gray scale) rod detectors are many times more sensitive than cone color receptors; the cone detectors have their own threshold illumination activation and saturation limits. In other words, very weak white light produces only black and white totally colorblind vision until the illumination levels are sufficient to start activating the far less sensitive cone detectors. But when rod detectors become saturated with brighter light, cone color vision starts to dominate vision. Beyond those bright levels of illumination, the cones also saturate and color vision becomes indiscriminate and even painful and can damage retinas.

Midway between colorblind rod vision and good color vision is a zone called Mesopic vision (0.001 to 3 cd m$^{-2}$), where color vision is weak and very impaired. For example, Mesopic vision often occurs when dark grey sunglass lenses are worn on an overcast day. Dark glasses also impair color contrasts. On brighter days, rod detectors become saturated and cone color vision starts to dominate vision. On even brighter days, the cones saturate and color vision becomes indiscriminate and painful or damaging. Light sensitive ganglion detectors participate in regulating eyelids and the size of the pupils in attempts to protect the retina from damage and pain.

Cloudless bright outdoor sunlight is far too intense for optimum color discrimination and such excessive sunlight is usually uncomfortable and potentially damaging, even if eyelids and pupils are minimized. For these reasons, mankind, throughout history, has instinctively sought various clever means to further limit the strains and dangers of high light levels for good color resolution and sharp 20/20 image focusing (for example, Eskimos invented slit visors to limit light reaching their eyes) and similar remedies remain a worldwide need with no holistic universal solution. Thus, billions of people wear various kinds of sunglasses to reduce excessive and damaging bright light exposure.

As indicated in FIG. 2 (Table 1), over ½ billion people suffer marked colorblindness and cannot distinguish true colors, especially green and red discrimination. About 9% of the global population (640 million) suffer from various types of colorblindness, including about 6.8% (470 million people) who suffer from red and green deficiencies (trichromacy) as shown in Table 1 and charted in FIG. 3. Hundreds of millions of truck and bus operator jobs, airplane pilots, firemen, policemen, and countless other color-demanding jobs cannot employ colorblind people. Many millions of colorblind car drivers and their passengers face extremely hazardous traffic light intersection risks of collisions, injuries, and fatalities—especially on rainy days or nights amidst background streetlights. Modifying all existing traffic intersection lights is impractical and would only correct one small portion of colorblind issues. Now that low-cost colorblind correction is possible, conventional traffic lights can be retained while dramatically reducing intersection collisions.

All people suffer varying degrees of scotopic (rod colorblindness) under very low illumination conditions such as dawn, dusk, or while wearing very dark sunglasses. And literally everyone unknowingly suffers very marked chromatic blue and red blurring human lens aberration halo defects, and thus, cannot enjoy the theoretical sharper than 20/20 focus capability of human retinas.

Various devices have been produced to protect human eyes from light damage. Prior art Polaroid films mainly reduce only very bright polarized reflective light. Prior art photochromic optics automatically darken and lighten roughly 1,000 times too slowly to meet truly safe vision needs. Dark neutral density (grey) mirror and absorption dye sun-wear degrade cone color discrimination. Slit and pinhole sunglasses limit the field of vision. No prior art sunglasses can significantly overcome the severe natural chromatic aberrations of the human lens, a severe degradation that becomes very pronounced under pure (narrowband) blue and pure red light illumination conditions. Large chromatic aberration is natural to all simple lenses, including the naked aqueous human eye lens. This is true because all optical materials (including water lenses) exhibit a large variation in index of refraction values across the blue to red spectrum. The index at blue wavelengths is much higher than red wavelengths. Thus, blue wavelength images focus far in front of the retina and red images focus slightly behind the retina. This is even true for people who qualify as having perfect 20/20 vision, with or without prescription corrective eyewear. But chromatic blurring can be considerably worse for those who wear strong corrective (prescription) eyeglasses or strong contact lenses.

To better understand this severe chromatic aberration defect, which most people are unaware of and ignore, see the eye chart in FIG. 5, compared with the charts of FIGS. 5A, 5B and 5C to see what 1, 2, and 3 diopters, respectively, of blurry color vision look like. Do not be confused by the black and white eye chart of FIG. 5. When the eye chart is only illuminated by pure deep blue wavelength light (not white light), the 2 diopter column (FIG. 5B—20/80 vision) illustrates the chromatic distortion that everyone with "normal" 20/20 vision would experience in blue light, but usually ignores. That blurry blue vision, even when combined with sharp 20/20 green-yellow vision, degrades the net visual acuity of every person. Red chromatic distortion has a similar halo blurring effect, just not as pronounced in the red as in the blue part of the spectrum. As noted, blurry chromatic aberrations are present in every person, and it limits almost everyone to 20/20 vision. The human eye is be capable of better than 20/15 (line 9 of FIG. 5) or even better than 20/10 (line 11 of FIG. 5) vision if chromatic aberrations were eliminated under the correct narrowband monochromatic illumination centered at approximately 550 nm (no blue or red light), which fortuitously happens to be the peak sensitivity spectral region of the eye.

It is helpful to note that common prior art broadband yellow-green color dye filters transmit light which "appears" in the brain as one yellow-green wavelength but which is not one narrow band of yellow-green wavelength light. Typical broadband prior art colored dye filters actually allow a wide band of greens and reds to pass, and such prior art wideband filtering methods cannot render maximum visual acuity, for deep red chromatic blurring still occurs with these prior art broadband green-yellow filters. Full comprehension of such spectroscopic optics is usually beyond the scope of typical optometry and ophthalmology; nevertheless, all of these subtle spectral vision impediments are very real and can be dramatically improved by the present invention.

Available prior art, including multi-layer interference coatings, which this inventor produced in the 1980s, dramatically enhanced transmission of narrow bands of blue, green and red wavelengths, and would have pleased not just colorblind people, but enthralled everyone with vibrant Technicolor dark sunglasses. However, that 1980s vacuum coating technology was too delicate and was abandoned because such lenses could not withstand harsh abrasion, and they severely cracked during the thermal expansion ordeals of common 100° C. fashion and sunglass tint bath exposures universally still employed by ophthalmic labs and eyeglass retail dispensers, despite the allure of solving the colorblindness problem decades ago.

Laminated color-enhancing interference lenses have been introduced by Enchroma, and are described in US published application number US20040114242, now U.S. Pat. No. 7,106,509. These lenses employ seven laminated layers, including two low-transmission polarizing films, to produce an optical process called interference "notch filtering." However, they suffer thermal stresses, are not suitable for large scale or large physical size window thin film applications, and are color-transmission-sensitive to light angles of incidence (i.e. they change colors with incident light angles). Although they are delicate and prohibitively expensive, they do serve as an example of restoring color vision to many colorblind people, similar to what the present inventor did decades before with multi-layer interference vacuum coatings. Enchroma lens performance is photographically depicted in FIGS. 6 and 7, illustrating color restored images with and without their interference laminates.

To better understand the prior art Enchroma colorblind laminated thin film lenses, FIG. 8A depicts the interference bandpass "notch filter" concept depicted in U.S. Pat. No. 7,106,509, designed to block a 50 nm wide blue-green (470 nm to 520 nm) band, and a 70 nm wide yellow-red (560 to 630 nm) band, but which undesirably change color with the angle of light incidence. The net light transmission of FIGS. 8A and 8B is very low because two polarization films are required by that prior art filter, which absorbs (and wastes) up to 85%-of the incident light (15% net transmission) and is largely unsuitable for low light level indoor applications. Aside from very low transmission issues, the shifting transmission wavelengths with incident light angles, and aside from several other shortcomings including very high cost issues, such delicate laminated optics risk high thermal stresses if fashion-tinted in near boiling water temperature tint baths. FIG. 8A is extracted from the prior art patent application, and FIG. 8B is an idealized prior art notch filter objective showing how a prior art "notch" located at about 580 nm (and more preferably, 560 nm) can assist colorblindness. The two additional artifact "notches" at 400 nm and 490 nm do little to correct green-red colorblindness.

SUMMARY OF THE INVENTION

It is recognized in the art that there is a need for a robust method and apparatus for providing color retinal enhancement and increased visual acuity.

In general, the invention described herein is directed to a vision enhancing optical device comprising a substrate and at least one exceptionally narrowband absorption dye on or within the substrate, the dye having a peak absorption wavelength and having sharp turn-on and cut-off spectral slopes to spectrally sculpt transmitted or reflected light, the at least one dye having a peak absorption wavelength and bandwidth to alleviate colorblindness, to enhance color contrast vision, to selectively notch-attenuate transmitted or reflected light, and/or to sharpen visual focus. One of the preferred narrowband dyes produces an absorption band having a peak absorption wavelength centered at or near 560 nm, having a bandwidth of about 20 to 60 nanometers. In some embodiments of the invention, the substrate is optically substantially transparent and may be a lens for eyewear, a contact lens, or a thin film interposed between a light source and a viewer, wherein the thin film includes, for example, window shades for sources of natural light and coverings for sources of artificial light such as incandescent, fluorescent and LED lamps. In other embodiments, the substrate is optically substantially opaque, and the substrate is a light sensor, paint, ink or a photograph.

Another aspect of the invention is directed to a method for enhancing visual acuity which includes providing a substrate and incorporating several narrowband absorption dyes on or within said substrate, wherein the combined narrowband dyes stepwise spectrally sculpt transmitted light to result in only one transmitted light band having a peak transmitted wavelength centered at or near 560 nm to markedly sharpen visual focus to far better than 20/20 vision. In this embodiment, multiple dyes are provided, each having a selected peak wavelength and narrow bandwidth absorption characteristic, with the dyes being combined on or within the substrate to provide resultant spectrally sculpted narrow transmitted bandwidth characteristic for the substrate. The method includes, in some embodiments, selecting a substrate from optically transparent eyeglass lenses, contact lenses, or thin films capable of absorbing the selected dyes to obtain narrowband transmission optical characteristics. In other embodiments, the step of incorporating at least one exceptionally narrowband absorption dye on or within the substrate includes incorporating combinations of selected narrowband absorption dyes which exhibit unusually sharp cut-on and cut-off absorption slopes at different wavelengths to stepwise and flexibly sculpt desired transmission characteristics having multiple narrowband transmission bands, such as simultaneous narrow transmission bands at blue plus green plus red transmission bands, herein called triband optics. Still another embodiment includes incorporating one broadband long-wave sharp cutoff dye and one broadband short-wavelength sharp cut-on dye to produce one narrow transmission band centered at about 550 nm to produce exceptionally chromatic aberration-free vision.

Broadly speaking, the present invention meets these varied needs by providing a substrate incorporating at least one, and preferably several, narrowband absorption dyes onto or into the substrate to stepwise sculpt the transmitted visible light spectrum prior to the light reaching the retina of an observer. Each dye has sharp turn-on and cut-off spectral slope at selected wavelengths in order to spectrally sculpt transmitted light to produce desired transmission or reflection characteristics of the substrate to correct most types of colorblindness, to exaggerate color contrast vision for everyone, to selectively notch-attenuate transmitted light, and/or to markedly sharpen visual focus. As discussed herein, a narrowband absorption dye is a dye which exhibits a strong absorption of light over a narrow spectral band, sometimes referred to herein as an "exceptionally narrow band" which is typically less than about 20 to 60 nanometers wide at one-half its selected absorption peak, as will be illustrated in the accompanying drawings. Only a few dozen such exceptionally narrowband absorption dyes exist out of millions of other known ordinary broadband absorption dyes. No narrowband transmission dyed exist, thus, the need to stepwise sculpt narrow transmission bands. In accordance with the invention, a single narrowband dye may be sufficient to achieve the desired visual compensation of red-green colorblindness, while in other cases, increased visual acuity can be obtained by combining multiple narrowband absorption dyes to create, or sculpt, very desirable equally narrow transmission bands at almost wavelength. In the latter case, for example, multiple narrow band absorption dyes, each having a different selected peak absorption wavelength, can be combined in or on a substrate to absorb incident light at multiple different wavelength bands, but omitting a dye at a selected wavelength band where light transmission is desired. This produces a "transmission notch" in the absorption continuum of wavelengths, to thereby allow light transmission at only the selected narrow band. It will be understood that multiple narrow band transmission notches can be provided, if desired, permitting sculpting of a desired transmission characteristic for the substrate. In similar fashion, multiple absorption dyes at spaced peak wavelengths, or spaced bands, can be selected to provide multiple absorption notches in the transmitted or reflected light.

In one embodiment of the invention, apparatus for enhanced visual acuity includes incandescent, fluorescent, or LED light sources, or lamps, having sculpted wavelength characteristics to provide unique colorblind-corrected lighting, requiring no eyewear whatsoever. Such apparatus may include filtering common broad-band light sources, or lamps with multiple narrow-band absorption filters which are selected in combination to produce a filtered light output having selected narrow spectral transmission bands to create, for example, unique colorblind-corrected artificial incandescent, fluorescent, and LED lightbulbs. The emitted light from such devices provides improved photopic color vision, mesopic dim light color vision, and also sharper scotopic night vision. A multiplicity of exceptionally narrowband absorption dyes can be combined, or sculpted, to produce selected output wave bands providing unexpectedly enhanced vision (including colorblind remedies) and more vibrant normal color vision. In other embodiments, similar surprisingly vivid color contrasts can be produced if narrowband inks of the present invention are deposited on white paper, or if single narrowband color paints of any wavelength are painted on white surfaces to render more vivid high contrast single colors not previously perceived by any prior art paint—especially if painted adjacent to each other for maximum comparative contrast. And of course, narrowband matrix dot printed images can be printed on white backgrounds to render vivid high contrast images also never perceived before on paper, posters and highway billboards.

In a preferred single-narrowband transmission embodiment of the invention for prescription and non-prescription eyeglasses, better than perfect 20/20 visual acuity is achieved by completely eliminating the naturally occurring severe blue and red chromatic blurring defects common to all human eye lenses. When chromatic halo blurs are totally eliminated by the method and apparatus of the present invention, then better than 20/20 super sharp photopic cone vision and scotopic rod vision occurs, and even the $10^{th}$ and $11^{th}$ lines of a standard eye chart (20/13 and 20/10 vision) can be read. Prior art devices cannot produce such very narrowband transmission optics without creating several very undesirable optical side effects, such as light-incident-angle defects, as will be delineated herein. Cerebral vision processing of colors and thousands of hues and brightness levels establish hierarchies of importance and senses of reality. Even static and dynamic motion depth perception is improved by enhancing color vision. This profound cerebral maze of vision and mood complexity is both fallible and deceptive, and they all can be greatly improved by the present invention.

As noted above, everyone suffers both chromatic blurry vision and large Mesopic (medium light level) color impairment. Both universal vision defects can be markedly improved by eyeglasses utilizing the present absorption dye invention. Furthermore, conventional dark, neutral density, sunglasses produce low light levels and thus produce rod-dominated, color-impaired, Mesopic black and white vision. Accordingly, another one of the objectives of the present invention is to avoid the onset of rod-dominated Mesopic colorblind vision produced by sunglasses by eliminating the prior art need for two dark polarizing films and eliminate angle-sensitive interference filters.

The exceptionally broad number of applications of the present invention only starts with spectacle applications. Glazed building and vehicle windows can be modified in accordance with the invention to improve worker moods, creativity, alertness, and productivity. Commercial vehicle (trains/planes/etc.) window treatments in accordance with the invention can improve passenger moods and render more enjoyable transportation. Although prior art dark absorbing window glazing is effective for space conditioning energy savings, and its installation cost can be recovered within a few years, such savings occur only with a sacrifice in "dulled" indoor moods and a huge loss of productivity, since prior art dark thin film window glazing also creates indoor Mesopic color impairment and Seasonal Affective Disorder (SAD), which may include negative mood swings, depression, and markedly reduced creativity and productivity. Such negative side effects can be overcome by the use of window treatments utilizing the present narrowband sculptable-spectrum invention, which can achieve the same or even higher energy savings while simultaneously improving both outdoor and indoor vision and providing marked increases in productivity. For example, in accordance with the present invention, a thin film covering for windows incorporates multiple narrow band dyes that can absorb the entire solar spectrum except for one narrow green-yellow solar transmission band centered near the peak detection wavelength of the retina. This embodiment uses dyes that can block over 80% of the solar energy while creating high indoor and outdoor visual acuity and better than 20/20 vision. For example, one result of improved "outdoor" vision (i.e., viewing very distant outdoor objects from indoors through such a film) will be that the outdoor objects will be in sharper focus. Reduced distant atmospheric haze is another advantage of such single narrowband transmission glazing. Highly filtered green-yellow sunlight with small amounts of blue and red narrow bands entering a room through such a film produces color-aberration-free sharper focused indoor vision, at a small sacrifice of full spectrum color vision. No single prior art dye can produce the multiple narrowband transmission of this invention; the present invention is unique in that regard.

Optionally, thin film glazed windows can provide dark appearance triband color transmission where almost all of the incoming solar energy is absorbed, except for three very narrowband high-transmission bands of red, green and blue natural solar light. By electing this option of the present invention, exceptionally vibrant indoor color illumination for everyone would result, while correcting colorblindness for some of the 6.8% of the population who suffer impaired indoor color vision, plus reducing indoor sunlight glare. Thus, glazed windows of the present invention can reduce indoor colorblindness, save energy, and, above all, markedly increase human productivity.

There is a third window thin film glazing option which predominantly transmits a very narrow band of green-yellow sunlight plus modestly attenuated narrow bands of blue and red, to achieve sharper focus while still illuminating rooms with all three primary colors and thus providing increased human productivity. Furthermore, the present invention allows an unlimited number of narrowband color transmissions and sculpted spectral hues to render maximum productivity. Studies have indicated that high color temperature illumination, rich in blue (not deep very blurry blue), is stimulating. Designs of the present invention permits full control of sculpted transmission bands, bandwidths, hues, visual acuity, color enhancement, and indoor illumination intensity.

Prior art building and vehicle glazing usually employ adhesive thin films or pull-down transparent shades, with pull-down transparent shades often being preferred for many reasons. The present invention preserves all of these prior art options, and allows additional options of combining permanent full spectrum glazes plus a pull-down thin film option to achieve chromatic aberration-free vision. Window options such as indoor and outdoor vivid color vision and a pull-down shade for zero chromatic distortion (sharper focus) are possible with the present narrowband invention. Most importantly, narrowband dye transmission filtration and lighting do not change colors due to angle of incidence of the sun or viewing angles during the day, as do expensive prior art interference coatings.

An additional advantage of the present invention is that thin film manufacturers can apply the present invention to their existing capital equipment. The present invention dye cocktail options would merely be added and mixed into the film polymers prior to film extrusion. No major capital equipment investments are necessary.

It can only be speculated why the thin film glazing industry is only annually penetrating about 0.03% of the theoretical market, despite the potential for rapid energy savings payback. A major question arises from this observation. Why does 99.97% of the population reject darkened prior art window films? A good thesis of such low and almost zero market penetration is their undesired and even depressing vision-produced emotional effects on people who adopt prior art dark glazing. If mild depression has indeed been the primary prior art drawback, then the stunning vision, and especially vibrant indoor illumination offered by the present invention can overcome most of the historical resistance to energy saving thin films, while stimulating stunningly higher creativity and productivity. Scientific studies confirm these productivity observations. It is also true that surveys indicate that dark window films are undesirable to most people for poorly defined reasons. The human vision and emotion reasons offered above are believed to be the underlying causes, which can be overcome by this invention.

It is well known to employers and indoor lighting experts that more appealing subliminal colors and subliminal blurry chromatic halo vision can affect moods and increase productivity by up to 10 percent. To appreciate this window thin film productivity impact, consider how a mere few single digit percent of increased productivity—not just thin film energy savings—can rapidly recover the full installation cost of improved window vision glazing. For example, based on current salaries, with just 5% higher productivity, the present invention can recover the entire thin film installation cost within just a few weeks, not years of energy savings—an unprecedented 100-fold glazing payback speed. Thus, a one-time glazing installation cost can be recovered at record speed and continue to reap big financial premiums comparable to a new endless profit line item. In other words, instead of prior art neutral density dark window glazing reducing productivity, the low-cost present invention will produce exceptionally valuable permanent increased productivity. It is comparable to turning a 5% prior art loss into a +5% gain—an impressive 10% endless positive difference.

Civilian and military telescopic sights, telescopes, microscopes, and other precision optical devices highlight the critical need for higher than 20/20 eye resolution. Even if such optics employ expensive perfectly corrected achromatic lenses or mirrors, the human eye still suffers very large chromatic blurring. In accordance with the present invention, a single narrowband transmission filter, centered at the peak sensitivity wavelength of the eye (about 550 nm), can provide much sharper and higher resolution vision in such optics. Such a single narrowband chromatic distortion-less filter can take the form of a telescope or microscope lens cap or a pair of spectacles.

Broad sports applications of the present invention abound. Nowhere is maximum visual acuity more essential than golf, which involves the smallest balls and largest distances (hundreds of yards). Superhuman focus vision under these conditions is a marked competitive advantage. Mere 20/20 vision is a definite golf handicap. There are about 23,000,000 golfers in America and an estimated 78 million golf spectators—totaling about 100 million potential U.S.A. beneficiaries of the present invention. Likewise, American baseball professionals, and the millions more paid attendance spectators—who wear prescription eyeglasses or contact lenses or who need no corrective eyewear—can all benefit by the better than 20/20 vision offered by the present invention.

About 100 million sunglasses are purchased by Americans annually, and worldwide, over 600 million pair per year. About 200 million Americans, and worldwide many more hundreds of millions, own and use sunglasses. Sunglasses are frequently exposed to brutal outdoor environments, which helps to explain why so many are damaged and so frequently replaced. Unlike most one-time window glazing applications and other one-time applications of the present invention, sunglasses represent a larger, on-going, centuries-old tradition.

It will be apparent to those skilled in these arts that the present narrow bandwidth absorption dye invention is superior to prior art interference optics, and has an untapped market potential, largely because of the low manufacturing cost of dyes, the high durability of dyes, the ability to improve color contrast vision, and above all—the ability to create higher workforce productivity. The present invention can be combined with Polaroid optics, photochromic optics, prescription ophthalmic eyewear, and various windowpane combinations of two or more pull-down thin film optical effects. However, single 550 nm transmission narrowband dark spectacles would not be allowed for roadway drivers who would not be able to see red traffic stop-lights. That serious safety issue can also be overcome by the present sculpt-able transmission spectrum narrowband invention, disclosed herein.

Of the many millions of dyes and pigments, only a rare few exhibit narrow absorption bands, and even fewer still can withstand the rigors of environmental exposure and non-toxicity. The entire visible spectrum is only 300 nm wide, and yet almost all commercial absorption and transmission dyes are very wideband chemicals with bandwidths of even hundreds of nanometers. For example, typical commercial yellow transmission dyes transmit from the short wavelength spectrum (500 nm), through the entire green, yellow, orange, and the red (700 nm) wavelengths. A typical broadband yellow commercial dye largely passes greens, yellows, oranges and reds, and only blue wavelengths are absorbed. Humans perceive such a wideband dye as a high transmission "yellow". Likewise, although there is no such thing as a single "magenta" wavelength, commercial magenta dyes transmit broad bands of blue and red wavelengths while absorbing wide bands of green—one of the essential cone-vision colors. Similarly, ordinary commercial cyan transmission dyes transmit only wide bands of blue and green (400-550 nm), largely blocking the essential red portion of the spectrum.

No ordinary dye simultaneously transmits narrow bands of all three essential blues, greens, and reds, while blocking the vast majority of visible spectrum between the blues, greens and reds. In other words, no dye transmits only narrow bands of blue, green, and red, while absorbing the bulk of the wide bands of magenta, cyan, and yellow. One objective of the present invention, therefore, is to achieve an exceedingly demanding transmission spectrum by mixing and sculpting several narrowband absorption dyes so that only the desired narrow transmission bands remain. A transmission band suitable for the present invention can be produced with narrowband dyes such as, but not limited to, water-insoluble VIS494B and VIS593A dyes made by QCR Solutions Corp, and/or water-insoluble dyes, ABS556, ABS574, P491, and/or ABS473, made by Exciton Corp.

Another rare narrowband absorption notch filter can be produced by employing multiple narrowband absorption band dyes such as, but not limited to, dye ABS556, ABS574 and/or dye ABS594, made by Exciton Corporation; only these narrowband absorption dyes are needed for green-red colorblind correction. Other short wavelength narrowband absorption dyes can be added to re-balance whites. Note, with emphasis, that all of the existing narrowband absorption dyes mentioned can be custom manufactured with slightly shifted wavelength absorption peaks. That capability makes the present invention even more versatile.

BRIEF DESCRIPTION OF THE DRAWINGS

The foregoing, and additional objects, features and advantages of the present invention will be understood by those of skill in the art from the following detailed descriptions of preferred embodiments when taken with the accompanying drawings, in which:

FIG. 1 diagrammatically depicts typical mental image processing errors of both color and brightness, and illustrates how even slight color or brightness differences can be artificially manufactured in the brain, not in the retina;

FIG. 2 illustrates in Table 1 average percentages of the prevalence of different types blue, green, and red colorblindness;

FIGS. 3A-3E depict diagrammatically how relatively small color contrast filtering can be magnified by the brain to correct green/red colorblindness or, in the case of sunglass weakened light, produce amplified green/red color contrast images;

FIG. 4A is a diagram of a normal white light spectrum and FIG. 4B illustrates what a relatively rare blue-deficient human retina sees—namely, strange white light at wavelengths where yellow is normally detected;

FIG. 5 depicts a four-column typical eye chart, each column having 11 lines of progressively smaller letters, and FIGS. 5A, 5B and 5C illustrate the dramatic effects of diopters of chromatic blurring which occur in natural human eye lenses;

FIG. 9 (Table 2) illustrates an approximation of the various types of large windows which can benefit from increased human workforce productivity or other color vision features;

FIG. 10 (Table 3) illustrates an approximation of the number of continuum light bulbs which can be improved by the present invention;

FIG. 14 illustrates the transmission vs. wavelength spectral properties of a single narrowband yellow-orange absorption filter intended to enhance green-red color-deficient vision for spectacles, contact lenses, windows or, lightbulbs;

FIG. 15 illustrates typical commercially available LED individual narrowband emission wavelengths;

FIG. 16 illustrates emission wavelengths for an individually variable intensity narrowband triple RGB LED lightbulb which has been uniquely optimized for colorblind individuals in accordance with the present invention;

FIG. 17 illustrates emission wavelengths for an LED-phosphor continuum light source with a narrowband absorption dye filter coated over the phosphor or otherwise incorporated into a bulb to provide enhanced color vision for green-red color-impaired people;

FIGS. 19 and 20 illustrate a normalized absorbance vs. wavelength spectral graphs of a triple narrow transmission RGB sunglass sculpted type filter, wherein FIG. 19 illustrates rod spectral responses reduced to extend Mesopic color vision while simultaneously attenuating bright sunlight intensity, and including a 560 to 580 nm narrowband absorption notch to enhance red-green colorblindness sunglass performance, and wherein FIG. 20 illustrates a block diagram repeat of FIG. 19 with three narrow transmission bands judiciously located to minimize broad rod response and incorporating a notch to improve green-red colorblindness and to attenuate up to about 90% of bright spectral daylight;

FIG. 29 illustrates a conventional light emitting diode (LED) lightbulb, which has a plastic helmet at 482 and heatsink at 484 that has at least one narrowband absorption dye mixed into or coated onto the plastic helmet; and FIG. 30 illustrates a common tubular fluorescent light bulb which has a thin plastic film that has been pre-doped with at least one narrowband absorption dye in accordance with the present invention, and which is wrapped around and affixed to the tubular lamp.

DETAILED DESCRIPTION OF THE PREFERRED EMBODIMENT(S)

Figure 6:
FIGS. 6 and 7 pictorially illustrate a red-green defective colorblind scene (FIG. 6) and the same scene corrected with a prior art Enchroma 580 nm "notch filter" (FIG. 7)

It is an object of the present invention to provide a method and apparatus by which vastly superior visual acuity may be provided for those who need superior, sharp focus vision which peaks in the green-yellow portion of the retinal response curve, and is devoid of severe natural human lens achromatic blue and red blurring.

It is another object of the invention to provide optical correction of colorblindness through the use of multiple narrowband absorption dyes or through the provision of narrowband notch-filtering of continuum type natural or artificial light sources.

Broadly speaking, the present invention is directed to a method and to apparatus for producing, in accordance with one embodiment, enhanced visual acuity by incorporating within an optically transparent substrate one or more exceptionally narrowband absorption dyes. Preferably, each dye has a sharp turn-on and cut-off spectral slope and a central absorption wavelength, with multiple dyes being carefully selected to spectrally sculpt transmitted light wavelengths to produce light transmission characteristics that will correct most types of colorblindness, will exaggerate color contrast vision for everyone, and will markedly sharpen visual focus. In one embodiment, the substrate may be, for example, prescription or nonprescription eyeglasses or contact lenses where the dyes are selected to provide a single narrow band spectral transmission to achieve better than perfect 20/20 visual acuity by completely eliminating the naturally occurring severe blue and red chromatic blurring defects common to all human eye lenses. In another embodiment, the substrate may be a thin film for use with window glass, either as an adhesive film or as a pull-down shade for windows, where, incorporated within the substrate, are dyes that are selected to provide a spectral transmission to produce enhanced window viewing color contrast from within a building as well as enhanced indoor color contrast illumination.

In still another embodiment, artificial lighting for enhanced visual acuity may incorporate light sources such as lightbulbs with similar selected narrowband absorption thin film coatings or shades on broad band emitting sources to provide unique colorblind-correcting artificial lighting, as from incandescent, fluorescent, and LED lamps. In these devices, the artificial illumination may have wavelengths selected to have narrowband spectral absorption notches typically centered around, but not limited to, 560 nm to 590 nm, in order to correct most indoor and nighttime green-red colorblind vision.

To begin to describe the long list of dramatic contrast vision improvements made possible by the present invention, reference is now made to FIG. 1 which illustrates at 10 a classic neural processing color and contrast illusion, created in 1995 by professor Edward Adelson, of MIT's Vision Science department (See, for example https://en.wikipedia.org/wiki/Checker_shadow_illusion). This Figure demonstrates typical deceptive mental image processing errors of both color and brightness, and illustrates how even slight color or brightness differences can be artificially manufactured in the brain, not in the retina. In FIG. 1, colors 1 and 3 are identical to 2 and 4 but are perceived differently. Thus, in accordance with the present invention, when actual images are narrowband optically filtered for higher contrasts before the light reaches the retina, mental processing of even slightly filtered colors can be favorably magnified in the brain. The present invention takes advantage of contrast vision to improve color vision including static and dynamic 3D distance vision.

As illustrated in Table 1 of FIG. 2, colorblindness is the world's largest and yet un-correctable eye disorder, for one in 11 (9.2% of global population, or 640 million people) are color-impaired or colorblind. One in 15 (6.8% of the global population, or 470 million) can be narrowband optically enhanced with the present invention, so the present invention comes close to a universal solution to the problem of colorblindness, and even more so if combined with prior art photochromics, polarizing films, scratch resistant coatings, shatter resistant materials, and the like.

FIGS. 3A-3E illustrate how narrowband notch filtering neurologically magnifies color contrast vision to enhance green/red colorblindness or, in the case of dark sunglass weakened light, to produce magnified green/red/blue color contrast images. FIG. 3A illustrates what a corrected green/red colorblind person would see with a single narrowband absorption notch filter inserted between the green and red spectrum in accordance with the present invention, and FIG. 3B illustrates what the same colorblind person would see without the inserted narrowband notch filter. Note that just one narrowband notch filter would transmit up to 85% of the available light compared to prior art interference filters, which transmit typically less than 25% of the light (a bad thing for colorblind people). FIG. 3C illustrates what a normal vision person, without sunglasses, would see in very bright sunlight (excessive glare), while FIG. 3D illustrates the view through dark grey sunglasses, which degrade color contrasts. Finally, FIG. 3E illustrates the same scene with equally dark (low net transmission) sunglasses incorporating narrow band dyes in accordance with the present invention, where the dyes only transmit very narrow bands of blue, green, and red light, such as depicted in simplified FIG. 20, to be described. Thus, eyeglasses which produce the results illustrated in FIG. 3E accomplish the goal of greatly attenuating bright light, but simultaneously enhancing color vision, not degrading it.

FIG. 4A illustrates a normal white light spectrum including at "a" the normal yellow band of the spectrum. FIG. 4B illustrates what the rare few (0.0001%) of the blue-colorblind human population sees; namely, the very strange white light band "b" where yellow is normally processed by full spectrum normal cones in the eye.

FIGS. 5, 5A, 5B and 5C each depict a typical eye chart, shown at 20, and the effects of blurred vision are illustrated by charts 22, 24 and 26 in the respective Figures. The normal eye chart 20 in FIG. 5 shows 11 lines of progressively smaller letters, wherein the ability to read only the first line of the eye chart represents 20/200 vision; line 2=20/100; line 3=20/70; line 4=20/50; line 5=20/40; line 6=20/30; line 7=20/25; line 8=20/20; line 9=20/15; line 10=20/13; and line 11=20/10 vision. The related charts 22, 24 and 26 of FIGS. 5A, 5B, and 5C, respectively, demonstrate what 1, 2, and 3 diopters of focus-error produced by blurry vision looks like. Using white light, a normal person with excellent 20/20 vision can read chart 20 to line 8. But if 400 nm deep blue light is used instead of white light to illuminate the chart, even a 20/20 person would have difficulty reading the $3^{rd}$ line of chart 20, for chromatic aberration due to that blue light would cause the chart to appear just as blurry, or out of focus, as the chart 24 in FIG. 5B, which is depicted as a "2 diopter" (2D) chart. This focus difficulty under this blue light would be caused solely by the higher index of refraction of the human eye at such deep blue wavelengths, and by the resulting natural chromatic aberrations experienced by all humans. "Chromatic lens blurring" is not to be confused with colorblindness, however; the two are unrelated, but this illustrates the severe natural chromatic aberration defect common to all people, and which most people are completely unaware of or ignore.

Figure 18:
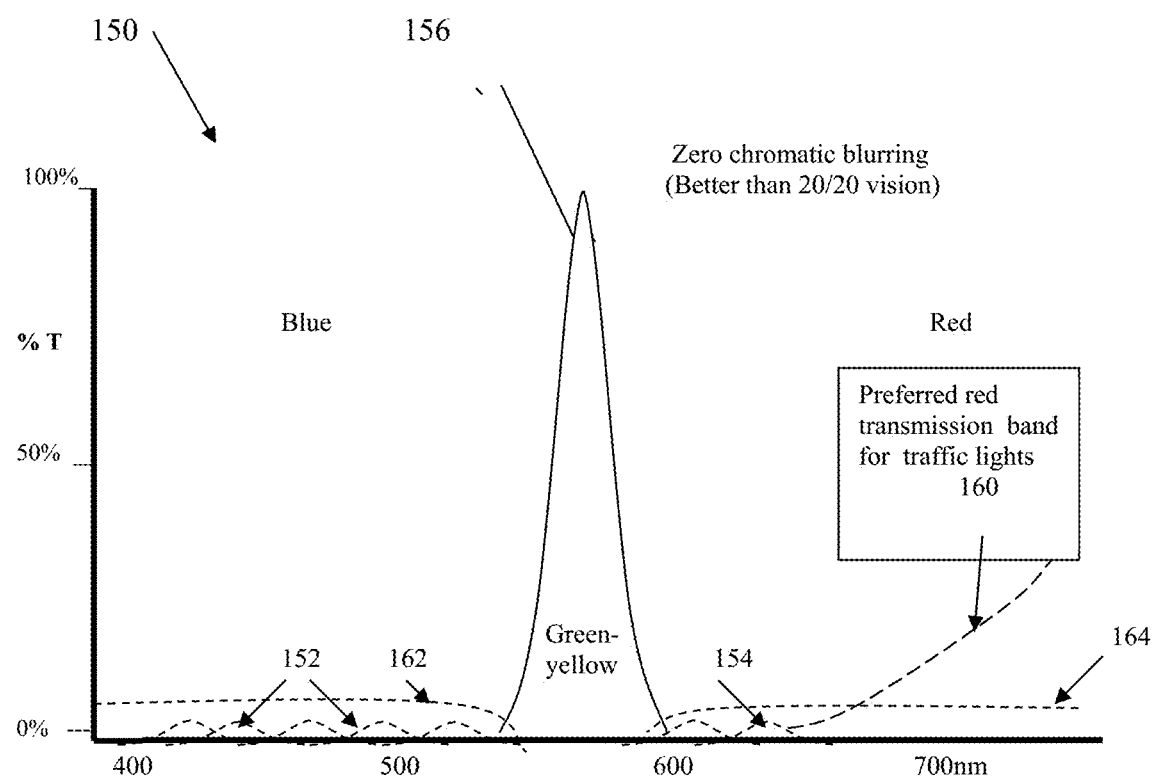
FIG. 18 illustrates the transmission vs. wavelength spectral properties for a narrowband transmission filter centered around 500 nm to 590 nm for better-than-20/20 focus spectacles, scopes, windows, flashlights, and the like, and which can optionally include a sculpted red transmission band to see red traffic lights.

The very blurry 2 diopter blue vision illustrated by FIG. 5B, even when combined with sharp 20/20 green-yellow vision, limits the net visual acuity of every person to no greater than 20/20 vision. Red chromatic blur creates a similar halo burring effect, just not as pronounced in the red as in the blue part of the spectrum. However, the human eye is capable of better than 20/15 (line 9) or even better than 20/10 (line 11) vision if chromatic aberrations are eliminated under correct narrowband monochromatic illumination centered at approximately 550 nm—the peak sensitivity spectral region of the eye (as illustrated in FIG. 18, to be described). In other words, better than 20/20 vision occurs when reds, oranges, greens, and blues are blocked (absorbed) by multiple narrowband absorption dyes, so that only a narrow band of 550 nm greenish-yellow wavelengths are allowed to pass through the human lens and sharply focus on the retina, not focus in front of or behind the retina. In accordance with one embodiment of the present invention, a combination of narrowband dyes is provided for eyeglasses or contact lenses that is capable of sculpting white light to transmit only one narrow band of yellow-green light, while totally absorbing chromatic aberration blue and red wavelengths, thereby providing much better than 20/20 vision and the ability to read lines 9, 10 and even line 11 of FIG. 5. In other words, a person with normal 20/20 vision might be able to read/resolve things at twice the normal distance with sculpted filters of the present invention.

Figure 7:
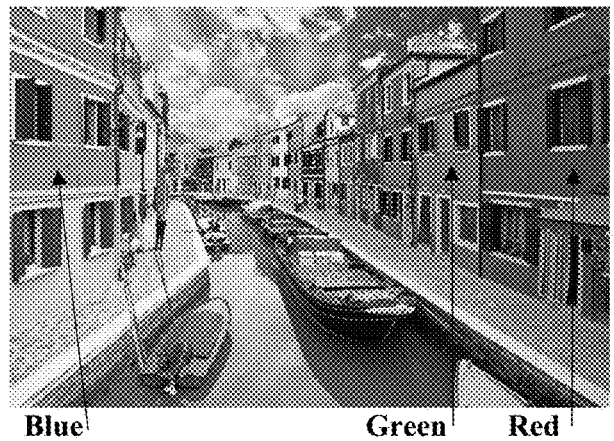

FIGS. 6 and 7 illustrate how a green and red color-impaired person can see blues normally but cannot discriminate reds and greens. FIG. 7 illustrates what happens when some wavelengths between green and red (namely yellow-orange) are blocked. Thus, FIG. 6 illustrates a red-green defective colorblind scene, where greens and reds appear to a colorblind person as olives and tans, while FIG. 7 depicts the same scene corrected with an Enchroma 580 nm "notch filter" in the form of an interference filter so that the colorblind person sees the actual red and green colors.

Laminated color-enhancing interference lenses (not dyes), have been introduced by Enchroma (U.S. Pat. No. 7,106, 509). They employ seven laminated layers, including two low-transmission polarizing films to produce an optical process called interference "notch filtering." These layers, however, suffer thermal stresses, can delaminate over time, are unsuitable for large scale or large physical size window thin film applications, and are color-transmission-sensitive to light angles of incidence (change colors with incident light angles). Although delicate and prohibitively expensive, they do serve as an example of restoring color vision to many colorblind people, similar to what the present inventor did decades before with multi-layer interference vacuum coatings. The Enchroma lens performance is photographically illustrated in FIGS. 6 and 7, which demonstrate how the images would appear to a colorblind person with and without interference laminates—which the present invention can now surpass with vastly superior performance using only a cocktail of angle-insensitive, rugged narrowband absorption dyes, which cannot delaminate.

Figure 8A:
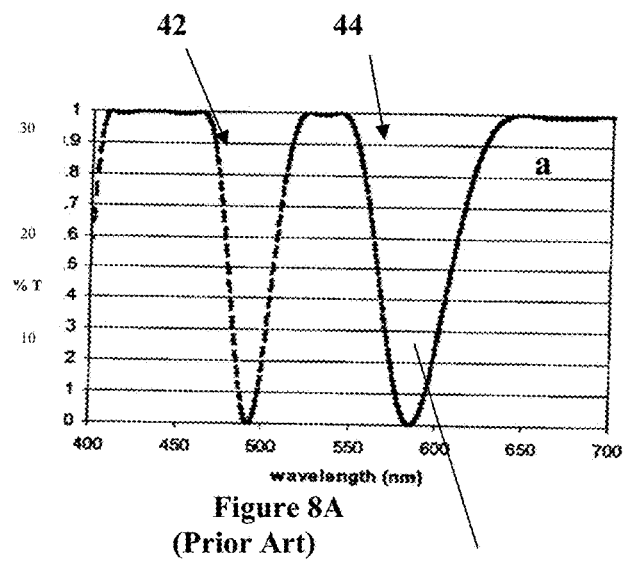
FIGS. 8A and 8B depict spectral charts of the Enchroma patented "interference notch filter" used in FIG. 7 to diagrammatically illustrate basic prior art colorblind remedies.
Figure 8B:
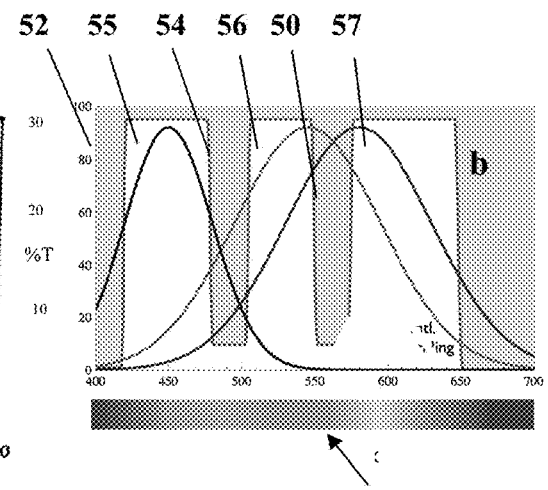

FIG. 8A depicts an actual spectral transmission vs. wavelength graph, showing wavelength vs. percentage transmission (% T) of a prior art Enchroma patented angle-sensitive, interference "notch filter" which demands two highly absorbing polarizing films, and results in a poor net transmission of only about 25% (dark lenses). To better understand the prior art Enchroma colorblind laminates, FIG. 8A illustrates at graph 40 the bandpass "notch filter" concept depicted in U.S. Pat. No. 7,106,509, designed to block a 50 nm wide blue-green (470 nm to 520 nm) band shown at 42, and the 70 nm wide yellow-red band (560 to 630 nm) shown at 44. This filter's overall maximum transmission (% T) is very low because two polarization films are required, and it thus absorbs (wastes) 65% to 75% of the incident light. In addition to its very low transmission issues, the filter produces transmission wavelengths which shift with incident light angles, and aside from many other shortcomings, including very high cost issues, such delicate laminated optics risk high thermal stresses if eyeglasses using such laminations are fashion-tinted in near boiling water tint baths. FIG. 8B is a simplified/idealized depiction of the FIG. 8A notch filter objective, further including a visible light spectrum 48. This Figure illustrates how a "notch" 50, generally corresponding to the notch 44 of FIG. 8A and located at about 580 nm (but more preferably, 560 nm), can assist colorblindness. The two additional artifact "notches" 52 at 400 nm and 54 at 490 nm, do little to correct green-red colorblindness. These extra un-needed interference band artifact absorption notches further reduce the total light reaching the retina, which is not the ideal thing to do to further-impair color-impaired people.

As noted above, everyone suffers chromatic blurry spectral vision plus another large Mesopic (medium light level) color impairment. Both universal vision defects can be markedly improved by the present far less expensive narrowband absorption dye invention. Dark neutral density sunglasses produce low light levels and thus produce rod-dominated, colorblind, Mesopic black-and-white rod vision. Therefore, one of the objectives of the present invention avoids the onset of rod-dominated Mesopic colorblind sunglass vision by eliminating the prior art need of two dark polarizing films, as will be discussed below with respect to FIG. 13 and following. Compare the similarities of this prior art FIG. 8 to just one of the unlimited versatile and angle-insensitive narrowband absorption dye approaches of the present invention to be discussed.

Prior art dark thin film building window glazing, which is often used to control solar glare, heating in warm weather or, heat loss in cold weather, also creates indoor mesopic color impairment, negative mood swings, depression, and markedly reduced creativity and productivity similar to well-known Seasonal Affective Disorder (SAD) effects—all of which can be overcome by the present narrowband sculptable dye invention. Although prior art dark absorbing window glazing or glazing films can recover their installation costs within 5-7 years through space conditioning energy savings, this occurs at a sacrifice in indoor vision and in lost productivity. However, the present invention can achieve the same or even higher energy savings while simultaneously improving both outdoor and indoor vision and marked increased productivity. For example, the present invention provides a coating or thin film incorporating multiple narrow band dyes that can absorb the entire solar spectrum, except for one narrow green-yellow solar transmission band centered near the peak detection wavelength of the retina. This option can block over 80%-90% of the solar energy while creating record high indoor and outdoor visual acuity—better than 20/20 vision. Viewing very distant outdoor objects from indoors with sharper focus is one result. Reduced distant atmospheric haze is another advantage of narrowband transmission glazing. Narrowband filtered green-yellow sunlight with small amounts of blue and red narrow bands entering a room, produces aberration-free sharper focused indoor vision, at a small sacrifice of full color vision. No single prior art dye can produce the unique multiple narrow band transmission of the present invention.

Optionally, glazed windows can provide triple narrowband color transmission where almost all of the incoming solar energy is absorbed, except for three very narrow transmission bands of red, green and blue solar bands. By electing this option of the present invention, vibrant indoor color illumination would result, thereby correcting colorblindness for some of the 6.8% of the population who suffer impaired indoor color vision. Thus, glazed widows of the present invention can correct indoor colorblindness, save energy, and, above all, markedly improve moods and increase human productivity. FIG. 9 (Table 2) illustrates an approximation of the huge number of windows in homes, offices, restaurants, stores, and laminated vehicle windows, which can benefit from such dark films without SAD disadvantages by utilizing films incorporating the multiple sculpted dyes of the present invention.

There is a third window glazing option which predominantly transmits a very narrow band of green-yellow sunlight plus attenuated narrow bands of blue and red, to achieve both sharper focus while still illuminating rooms with all three primary colors to enhance human productivity. Furthermore, the present invention allows an unlimited number of narrowband color transmissions and hues to render maximum productivity. Studies have indicated that high color temperature illumination, rich in blue, is stimulating. Designs of the present invention permits full control of transmission bands, bandwidths, hues, visual acuity, color enhancement, and illumination intensity.

Prior art building and vehicle glazing usually employs adhesive thin films or pull-down transparent shades. The present invention preserves all of these prior art options, and allows additional options of combining permanent full spectrum glazing plus pull-down thin film options to achieve chromatic aberration-free vision. Window options such as indoor and outdoor vivid color vision and a pull-down shade for zero chromatic distortion (sharper focus) are possible with the present narrowband invention. Most importantly, narrowband dye transmission filtration and lighting do not change colors due to angle of incidence of the sun during the day as do expensive prior art interference coatings.

Carrying the above angle-insensitive absorption notch colorblindness filtration concept one step further to light-source filtration embodiments, it has been found that indoor colorblindness under artificial indoor lighting conditions can also be corrected in accordance with the present invention. Incandescent and fluorescent lights produce a white light spectral continuum of illumination which can also be "notch-filtered" as discussed above so that most of the light continuum from incandescent or fluorescent light sources would still be present for indoor lighting—minus a small notch of yellow-orange (~560 to 580 nm) light. Such filtered artificial lighting would appear slightly pink with slightly richer greens and reds to people of normal vision, but most colorblind people would not suffer indoor artificial light colorblindness. These profound color vision effects have been prototyped and clinically proven with 100% success on both severe duetan and protan colorblind patients. Prototyped incandescent and LED light bulbs can be either covered or coated with notch-filters in accordance with the present invention to correct indoor artificial lighting colorblindness, while simultaneously enriching colors for normal vision. FIG. 10 (Table 3) illustrates an approximation of the number of continuum light bulbs which can be improved by the present invention. Catering to 22 million American colorblind people, each typically needing 50 to 100 color enhanced artificial lightbulbs per residence, represents an ambitious undertaking of over 1 to 2 billion new—preferably LED—lightbulbs just in the USA. But all 120 million USA residences can benefit by enhanced artificial lighting and improved moods. An equal number of commercial and industrial lighting opportunities exist. Worldwide, the need is many times that of the U.S. Retail applications with more colorful food and clothing are also more appealing.

Figure 11:
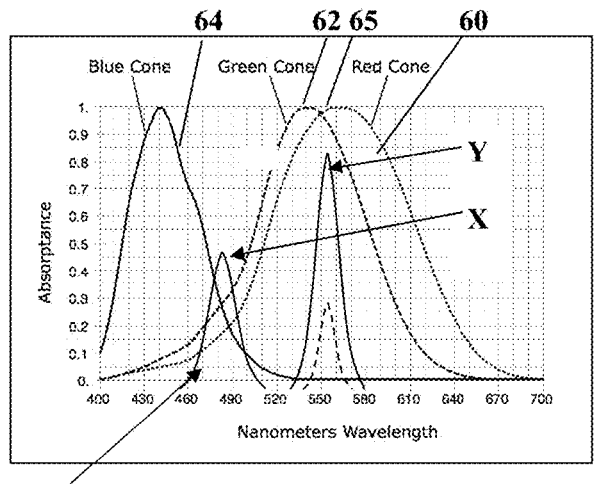
FIGS. 11 and 12 illustrate normal red, green, and blue retinal cone spectral responses, and abnormal green-red retinal cone spectral responses, respectively.
Figure 12:
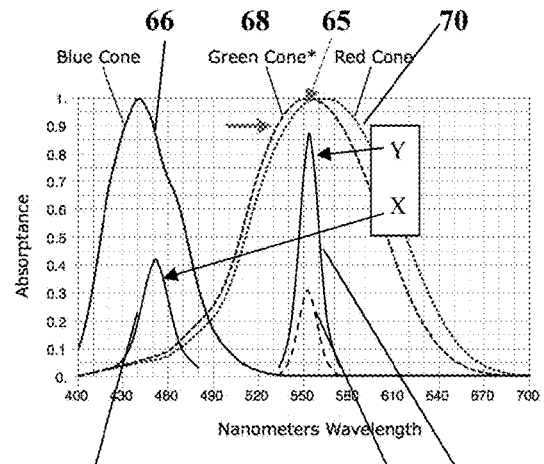

FIGS. 11 and 12, respectively, graphically illustrate normal and colorblind retinal responses. FIG. 11 is a graphical illustration of absorbance vs. wavelength (in nanometers) depicting at curves 60, 62 and 64, respectively, the responses to incident light of normal red, green, and blue cone spectral receptors, or cones of the human eye, wherein the blue cones have a peak sensitivity at a wavelength of about 440 nm, the green cones have a peak sensitivity of about 540 nm, and the red cones have a peak sensitivity of about 570 nm. As illustrated at 65, there is a slight dip, or natural notch between the normal retina's green and red cone peak sensitivity, or a natural absorption notch in the normal eye, which is all that a normal eye needs to discriminate greens and reds. FIG. 12, however, is a graphical illustration of absorbance vs. wavelength (in nanometers) depicted at curves 66, 68 and 70, respectively, the responses to incident light of typical abnormal colorblind green-red retinal cone spectral responses to light. This Figure illustrates a colorblind case where peak blue cone sensitivity, illustrated by curve 66, remains at about 440 nm, but peak green cone sensitivity, illustrated by curve 68, is slightly shifted from the normal 540 nm to about 550 nm, and peak red cone sensitivity, illustrated by curve 70, is slightly shifted from the normal 570 nm to about 560 nm. As illustrated, most colorblind people have green and red cone spectral response curves 68 and 70 shifted toward each other so that the small +/−10 nm cone response, or sensitivity shifts cause a near red-green overlap. As a result, the natural green-red notch 65 is largely missing, so that greens and reds cannot be distinguished by colorblind people. An artificial narrowband notch to compensate for the shifted responses and to separate the red and green response curves is needed, and is provided by the present invention.

To compensate for the abnormality illustrated in FIG. 12, a single narrow absorption band 72 and illustrated by curve "Y", is provided in the path of the incident light in accordance with the invention, to effectively separate green and red cone spectral responses. In effect, the narrow absorption band moves the two response curves 68 and 70 slightly farther apart to emulate the response of normal retinas. Such a narrow absorption band is provided by a narrowband "notch" absorption dye having a spectral response curve illustrated by the absorption curve 72 and incorporated, for example, in a suitable transparent substrate between the incident light source and the retina. This dye has an absorption band "Y" with its peak absorption centered at about 560-580 nm, for example, and can be applied to nearly water-clear eyeglass or contact lenses or thin window films. In this preferred embodiment, almost all of the incident light passing through the dyed substrate can still reach the retina if just a very narrow band of light between the green and red spectra is absorbed by this one narrowband absorption dye. Absorption of impinging light in the frequency band Y effectively separates the green and red wavelength responses of the retina so the eye can more readily distinguish these colors, thereby compensating for the colorblindness that is caused by the sensitivity overlap illustrated by curves 68 and 70. Curve 72 illustrates a slightly higher concentration of the dye used to separate the green and red responses of the retina. If desired, a lower concentration of the dye may be used, as illustrated by curve 73, at the same peak wavelength, which has the effect of producing a narrower absorption bandwidth. In either case, the insertion of this dye simulates the normal retinal properties illustrated in FIG. 11 by effectively restoring the natural notch 65. This single narrowband dye application is an exception to other embodiments of the present invention, which otherwise call for the use of multiple narrowband dyes to sculpturally enhance visual acuity and to intensify color vision for everyone.

Just one absorption notch provided, for example, in an otherwise nearly clear lens for eyewear (or in window thin films), as described above, can provide the necessary green-red colorblind correction, while providing a high net light transmission of about 85% to over 90%. That differs markedly from ~75% absorption (~25% transmission) produced by prior art dark colorblind lenses. Colorblind people ordinarily need as much high contrast light as possible. Surprisingly, this single notch embodiment for enhancing green-red colorblind vision also magnifies and intensifies green-red color contrast for normal vision, by incorporating the narrowband dye illustrated by curves 72 and 73 for normal vision to increase the normal gap 65 as illustrated in FIG. 11, which means that all current and future prescription eyeglasses, contact lenses, and windows can be readily single-notch filtered to yield more vivid greens and reds for everyone without having a dark appearance. Thus, clear eyewear lenses can have either a slight or pronounced 560 nm narrowband notch "tint" 72 or 73 to yield almost undetectably clear tinted lenses or windows, and yet provide more vivid greens and reds for everyone—for normal and colorblind people. Similarly, an absorption notch such as that illustrated at 72 or 73 in FIG. 12 can be applied to essentially all aftermarket clear building and vehicle windows or, to all new window installations, so that viewing outdoor scenery through such nearly clear windows would provide more vibrant greens and reds for normal vision people, while also correcting for indoor and outdoor colorblindness. Such clear, notch-filtered window films would allow outdoor light to enter a building pre-optically-filtered to render green and red indoor objects more vibrant for normal vision, while correcting for colorblindness, thereby providing more pleasing vision while improving moods, creativity, and productivity. Additionally, the narrow band green-red notch embodiment provided by narrowband dye 72 and 73 may also be provided in laminated, shatter-resistant windows such as those used in commercial applications, and more particularly in automotive applications, by the application of this nearly clear narrowband dye in a normal thin film laminated between the two sheets of vehicle glass. This would have the beneficial effect of helping automobile occupants and especially colorblind occupants, see red and green traffic lights with maximum color contrast. It is difficult to imagine USA vehicle-glass manufacturers omitting such a low-cost green-red color enhancement because one in 12 male drivers is colorblind, and there is a big need to more vividly distinguish daytime and especially nighttime red and green traffic lights from a distance. Many countries do not even issue driver licenses to more than 100 million colorblind people, thereby hugely impacting national economies. Without the present invention, colorblind drivers would normally see both red and green traffic lights as various shades of tan/brown. FIG. 3B and FIG. 6 illustrate how the green and red colors of traffic lights become indistinguishable to colorblind people. Without this laminated windshield colorblind embodiment, a nighttime colorblind driver would not be able to distinguish a red top traffic light from a bottom green traffic light because, at a large distance, top and bottom lights would be indistinguishable and red (stop) and green (go) would both appear as shades of brown/tan. Thus, laminated vehicle windows of the present invention not only are essential to colorblind vehicle occupants, but can also create more vibrant greens and reds for normal vision vehicle drivers and passengers. The present low-cost color-enhancing invention should be legally required in all vehicle windows for improved highway safety. A large percentage of highway accidents and fatalities at traffic light intersections can be eliminated by the present invention. Fortunately, such a colorblind correcting film may be applied to the existing millions of vehicles presently on highways either as an aftermarket window film or as a nearly clear thin film alteration to laminated new vehicle windows. This optical highway safety embodiment applies to roughly 470 million global, and about 22 million U.S. colorblind drivers and passengers, who are currently highway hazardous drivers, and who are unknowingly responsible for countless accidents and fatalities. In just the U.S. there are over 40,000 fatalities (and many times more accidents). All of the many millions of dangerous colorblind drivers have had no remedy to their vision impairment, until now. Now, vehicle manufacturers and aftermarket vehicle owners can eliminate the problem by either wearing colorblind-correcting eyewear or simply laminating the vehicle windows.

Although only one narrowband "notch" band "Y" centered at about 560-580 nm, as illustrated by absorption curve 72, is desirable to restore more vibrant green and red vision to color-impaired people and to intensify green and red color contrast for normal vision people, an optional "X" absorption band, illustrated by absorption curve 74, with a peak at about 485 nm, may be provided, mainly to rebalance white hues by absorbing some of the blue wavelengths. FIGS. 11 and 12 thus depict the effect of superimposing two dye-produced narrow absorption bands ("X" and "Y") on the retinal rods and cones. This effect is similar to that produced by delicate prior art laminated interference lens coatings used to correct colorblindness (illustrated in FIGS. 8A and 8B), but incorporates the present invention advantages of using rugged and angle-insensitive dyes. Both the "X" and the "Y" peak absorption wavelengths and bandwidth notches can be varied, or sculpted, by careful selection of one or more dyes and controlling their peak bandwidths and concentrations in accordance with the present invention. One advantage of using a lower concentration dye, as illustrated in FIGS. 11 and 12 at 73, is that very little or even no blue absorption dye 74 is needed to rebalance perceived white hues, while correcting colorblindness plus enhancing greens and reds for normal vision.

The three blue, green, and red cone sensitivity bands 66, 68 and 70 in FIG. 12 are fixed in an individual retina, but the light impinging on the retina can be infinitely varied in intensity, by varying (sculpting) the dye peak wavelengths and concentrations (thus, bandwidths), by employing an unlimited combination of narrowband absorption dyes to achieve any degree of color enhancement, and any degree of chromatic impairment reduction. Such dyes may be incorporated not only in eyewear, but in thin films for use with windows and digital light sensors and emitters, as well. The use of a higher concentration of notch dye 72, as illustrated in FIG. 12, creates a higher discrimination of greens and reds, not just to correct colorblindness, but to increase color contrast and vividness for normal vision. Accordingly, the invention encompasses the entire range of narrowband absorption dye bands, exemplified by curves 72 and 73, wherein the absorption percentage can range from single digits to nearly 100%. These infinite variabilities and the greatly improved ruggedness of narrowband absorption dyes result in distinctly superior vision technology over prior art interference films.

Of the many millions of dyes and pigments, only a rare few exhibit narrow absorption bands, and even fewer can withstand the rigors of environmental exposure and non-toxicity. The entire visible spectrum is only 300 nm wide, and yet almost all commercial absorption and transmission dyes are very wideband chemicals with bandwidths of even hundreds of nanometers. For example, typical commercial "yellow" transmission dyes transmit from the short wavelength spectrum (500 nm), through the entire green, yellow, orange, and red (700 nm) wavelengths. A typical broadband "yellow" commercial dye largely passes greens, yellows and reds, and only blue wavelengths are absorbed. Likewise, commercial magenta dyes transmit broad bands of blue and red wavelengths while absorbing wide bands of green—one of the essential vision colors. And similarly, ordinary commercial cyan dyes transmit only wide bands of blue and green (400-550 nm), largely blocking the essential red portion of the spectrum. No ordinary broadband dyes can simultaneously transmit narrow bands of all three blues, greens, and reds, while blocking the vast majority of visible spectrum between the blues, greens and reds. In other words, none transmit only narrow bands of blue, green, and red, while absorbing the bulk of the wide bands of magenta, cyan, and yellow. To sculpt the exceedingly demanding narrow band transmission spectrum needed for the present invention, several absorption dyes are mixed (thus, "sculpted") so that only the desired narrow transmission bands remain.

Figure 13:
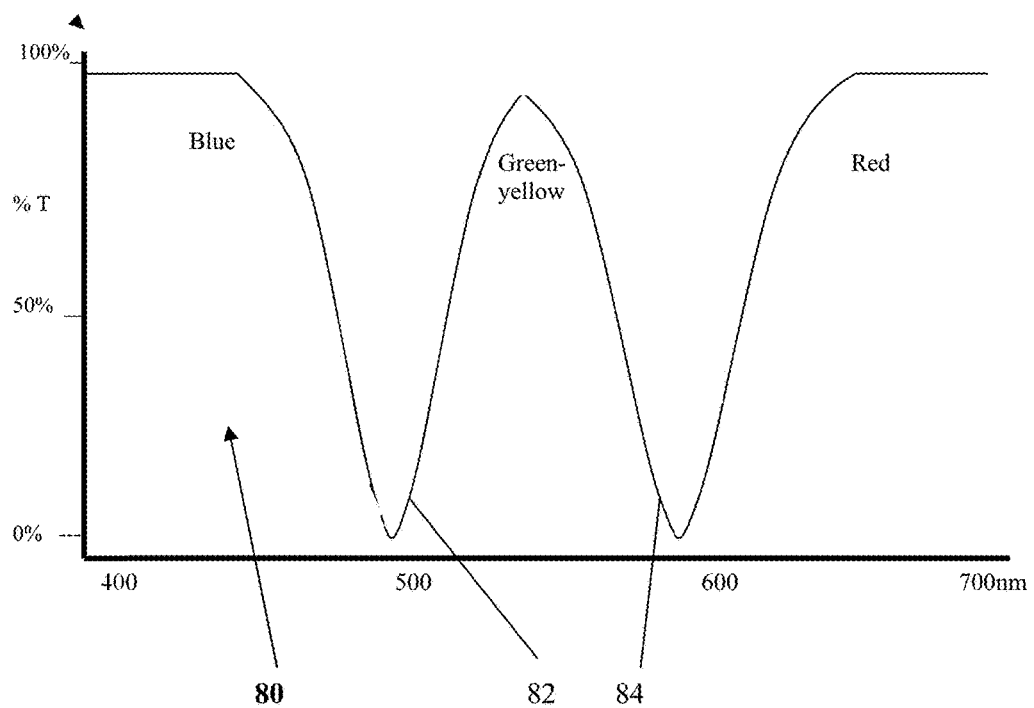
FIG. 13 illustrates the transmission vs. wavelength spectral properties of a cocktail of selected narrowband dyes in accordance with the present invention.

FIG. 13 illustrates at curve 80 the transmission vs. wavelength spectral properties of an embodiment of the present invention which produces results similar to the results produced by prior art interference filters, but does so by employing just two narrowband absorption dyes selected in accordance with the present invention. Two narrow absorption bands, or notches, 82 and 84 in curve 80 are examples of dyes made by Exciton (http://exciton.com/selectiveabsorbers.html), and QCR Solutions (http://www.qcrsolutions.com/Site/Ultraviolet_and_Visible_Dyes_QCR_Solutions_Corp.html). Note that many of their narrowband dyes are off-the-shelf dyes, but can also be custom modified to shift their narrowband spectral wavelengths. As illustrated by curve 80, the spectral properties of these sculpted narrowband dyes provide absorption notches 82 and 84 at selected peak frequencies, with the notches exhibiting sharp turn-off and turn-on spectral absorption transition slopes 86 and 88 at selected wavelengths below and above their corresponding peak wavelengths to spectrally sculpt desired transmitted bands of visible light, and as described above, such dyes are capable of much higher performance than prior art laminated thin layers of interference retardation and Polaroid films.

The absorption notch or band 82 illustrated in FIG. 13 can be produced with parts-per-million of the narrowband water-insoluble VIS494B and VIS593A dyes made by QCR Solutions Corp; and/or water-insoluble dye P491 and/or ABS473, made by Exciton Corp. Absorption notch or band 84 in FIG. 13 can be produced by employing parts-per-million of narrowband dyes such as, but not limited to, dye ABS574 and/or dye ABS594, made by Exciton Corporation. Only the narrowband absorption dye that produces band 84 is needed for green-red colorblind correction, while other short wavelength narrowband absorption dyes can be added to re-balance whites, as discussed above with respect to FIG. 12. It should be emphasized that all of the existing narrowband dyes mentioned can be custom manufactured with shifted wavelength absorption peaks, making the present invention even more versatile.

Completely colorblind retinal rod sensors are exceptionally sensitive to weak light, and they overwhelm the much less-sensitive red, green, and blue cones under low-light conditions. Thus, the highly sculptable spectral properties of the present invention offer a novel opportunity to selectively absorb and suppress a portion of the extremely high-sensitivity rod wavelengths (which peak at 498 nm) so that color cone sensors are less overwhelmed under low light level conditions, thereby extending improved color vision into dawn and dusk low light level conditions or, also under very dark sunglass lens conditions. In other words, mesopic low light level vision can be more color enhanced by proper insertion of narrowband absorber dyes, discussed in more detail concerning FIGS. 18 and 19. By intentionally absorbing much of the super-sensitive rod wavelengths surrounding 498 nm (band 82), mesopic vision can be selectively suppressed, much more than cone color sensor suppression. The all-important difference of the present invention is to accomplish these improved vision goals by using narrowband dyes, not undesirable multi-layer interference films which suffer many shortcomings, including the overall reduction of received light. As previously noted, the X and Y absorption bands in FIG. 12 can be infinitely varied in intensity and position by using narrowband absorption dyes to achieve any degree of color enhancement, and any degree of chromatic impairment reduction. These infinite variabilities and greatly improved ruggedness of narrowband absorption dyes result in a distinctly superior vision technology over prior art interference films.

A sculpted dye combination having the spectral configuration of FIG. 13 transmits several times more light—about 85%, compared to about 25% available with prior art interference coatings, and this added light is critically needed by colorblind people. Narrowband notch filter dye configurations such as those of FIG. 13 do not change the wavelengths of the transmitted light as a function of light angle of incidence, and do not need two dark Polaroid film laminates. Simple dyes are many times cheaper to manufacture and are also many times more durable than prior art laminations which require many delicate super thin films. Because dyes can be dispersed directly into a polymer, safe standard fashion lens-tinting remains possible. More stunning (higher contrast) blues, greens, and reds are achieved with the present invention, while partially suppressing totally black-and-white rod vision.

Not only can the notch filtration discussed above be applied to eyewear, it can be applied to daylight window indoor illumination and artificial indoor illumination light sources as well. FIG. 14 depicts at curve 100 wavelength vs transmission characteristics suitable for film window glazing, prescription and non-prescription eyewear, and even spectrally sculpted artificial light sources such as lamps or lightbulbs which incorporate a single narrowband dye having an absorption notch 102 centered at a peak wavelength of ~560 nm. This dye is used to correct colorblindness by implanting a notch filter between the green cone response spectrum and red cone response spectrum to enhance green-red color-deficient vision, as discussed above with respect to FIG. 12. The dye which can produce the narrow transmission band 102 in FIG. 14 can have parts per million of narrowband dye ABS574 and/or ABS594 made by Exciton Corporation. A second narrow absorption band 110 having a peak wavelength of about 500 nm may also be provided, as illustrated in FIG. 14. This is not critical to aiding red-green colorblindness, but can be included to remove a slight blue hue to create whiter images, as also discussed with respect to FIG. 12. Absorption band 110 can be produced by using parts-per-million of several narrowband dyes that absorb light having wavelengths shorter than about 500 nm.

To be more clear about FIG. 14 and the remedy to colorblindness of the present invention, the cause of most colorblindness referred to with respect to the illustration of FIG. 12 should be revisited. As has been discussed, FIG. 12 shows the retinal green cone spectral response 68 almost overlapping the spectral response 70 of red cones. Research has shown that if a narrowband interference notch filter is imposed at about 580 nm (see also FIG. 8A) between the absorption wavelengths of the green and the red cone spectral detectors in a retina, and if more red wavelengths can pass, colorblindness retinal defects are improved. Particular Enchroma prior art interference technology has been used to provide a notch in this same region, but it also produces an unnecessary second notch centered at about 490 nm, depicted at 42 in FIG. 8A. As previously stated, only one very narrowband absorption notch filter, centered between the red and green cones at about 560 nm-580 nm (FIG. 14) is actually needed by most colorblind people in order to markedly differentiate greens from reds. Such red and green vivid color differentiation is photographically illustrated in FIGS. 3A-3E and in FIG. 7. If only a single narrowband absorption notch dye 102 (FIG. 14) is employed, the resulting vibrant (high color contrast) green and red vision would be accentuated with slightly more vivid blues—a good-mood enhancer. Furthermore, it follows from FIG. 14 that a thin window film (or a transparent roll-down shade) incorporating a dye with a single narrowband absorption notch filter 102 would produce bright indoor daylight window illumination—minus the narrow yellow-orange (~560 nm-580 nm) part of the daylight spectrum, and thus, can vividly aid indoor colorblindness illumination (with artificial indoor lights off). Such a narrowband window filter would only absorb a small percentage of the total incoming daylight and would be interpreted by normal-vision-people as a desirable slightly blue indoor hue with enhanced green and red indoor illumination. But most colorblind people would enjoy more vibrant indoor reds and green full indoor daylight color vision without eyewear. Adjustment of the color balance of such a filter may be accomplished, as before, by the addition of a second dye, or combination of dyes, to produce a second narrow-band notch illustrated at 110 to reduce the slight blue tint of the light passing through the filter.

An optional colorblind corrective window notch filter is possible which requires no thin polymeric film adhesion to windows. Since almost all new modern windows are double or triple pane windows, it is readily possible to solvent-coat a micron thickness coating of the aforementioned narrow-band dyes or mixtures of dyes directly to an interior surface of one of the multi-pane glass window surfaces, with the window glass serving as a substrate for the dye. Such a direct application of an ultra-thin coating of narrowband color-enhancing dyes between the panes would protect the film from abrasion and would inhance indoor and outdoor viewing colorblindness, while producing more vibrant greens and reds for everyone. However, a preferred embodiment of this invention is not a permanent thin film applied to the window, but instead, a replaceable pull-down window thin film, similar to a window shade, with the dye imbibed into the thin film shade (or multiple shades).

Carrying the above absorption notch colorblindness filtration concept one step further to light-bulb filtration embodiments leads to correcting colorblindness indoors, under nighttime artificial indoor lighting conditions. Incandescent and fluorescent lights produce a white light spectral continuum of illumination, which can also be "notch-filtered" as described with respect to FIGS. 11 and 12. In other words, most of the light continuum from incandescent or fluorescent light sources would still be present for indoor lighting—minus a small notch of green-yellow (~560 nm) light. Such filtered artificial lighting would appear slightly bluer with richer greens and reds to people of normal vision, but most colorblind people would not suffer indoor artificial light colorblindness. According to the present invention, artificial light sources, such as lightbulbs, would be either covered or solvent-coated with a FIG. 14 notch-filter to correct indoor artificial lighting colorblindness. Similar color vision enhancements also apply to narrowband filtering modern phosphorescent-style FIG. 17 light emitting diode ("LED") lighting.

Instead of the above absorption dye approach to indoor lighting, a novel and preferred colorblindness LED lighting approach is possible, as shown in FIGS. 15-17. FIG. 15 depicts a typical array of individual narrowband emission wavelengths for LED lamps, while FIG. 16 depicts narrowband red, green and blue emission wavelengths 120, 122, and 124, respectively, for original LED quasi white light sources. FIG. 17 depicts an output waveform 130 representing more recent multi-phosphor coated highly efficient blue LEDs which stimulate a blue to red continuum of LED light to produce a near-continuum white light output, which more closely approximates the ultimate solar spectrum continuum than 3 distinct LED emitters. Because blue-stimulated phosphors are more electrically efficient light sources, almost all LED lightbulbs are now the phosphor type LEDs, which cannot correct colorblindness like distinct color LEDs. Note, however, that a phosphor type LED lightbulb can be coated or covered with a thin film absorption notch filter dye having an absorption characteristic illustrated by narrowband 132 in FIG. 17 to correct residential, commercial, and workplace colorblindness. Clearly, a small amount of LED phosphor light would be lost in notch-filtering and correcting LED colorblindness, but LEDs are very efficient and even with a small amount of absorbed light would still be a superior light source—worth sacrificing for a far more important improvement of disabling colorblindness suffered by so many people. The illustrated LED notch filter 132 can also take the form of liquid-dipped thin film or one of several elastic or rubbery thin film sheaths imbibed with one or more of the narrowband absorption dyes previously cited.

An optional high LED efficiency colorblind correction, requiring no absorption notch filter sheaths or eyewear, can be achieved by assembling a light source consisting of multiple carefully selected narrowband discrete LEDs to simulate a notch filter by not emitting light in the green-yellow 560 nm spectrum, similar to that of the notch 132 in FIG. 17. As noted, LED bulbs are available in the palette of colors/wavelengths illustrated in FIG. 15, and selection of LEDs with the RGB characteristics of waveforms 120, 122 and 124 (FIG. 16), provides the desired colorblind correction. However, it is noted that the particular filter embodiment of FIG. 17 permits the colorblind user the option of infinitely tuning the colorblind LED continuum lightbulb wavelengths to richer reds and greens in order to compensate and optimize the LED color correction per individual colorblind person. The difference between this and the use of selected discrete LED lightbulbs in accordance with FIG. 16 is the infinite LED tuning available with the embodiment of FIG. 17, as opposed to the need to select each red and green diode for its particular characteristics (brighter or dimmer, or narrower or wider discrete emitting diode colors).

The above narrowband and wideband LED colorblind embodiments of the present invention apply to white light illumination and correcting colorblindness and enhanced color vision. Clearly, the LED embodiment of the invention applies to multiple lightbulbs per residence, several more lightbulbs per colorblind person at workplaces, and to most retail stores. Prior art warm white LEDS do very little to improve colorblindness. Cool white and daylight prior arts do even less to correct type 4 & 5 (Table 1) colorblindness. However, blue-rich prior art phosphor LEDs actually do improve type 6 (in Table 1) blue colorblindness, which afflicts only 0.0001% (10 per million) of the world's population. It should also be noted that color television, color computer displays, and cell phone can be notch-filtered to enhance video colors for colorblind people.

It will be recalled that prior art interference notch filters not only absorb three visible bands of light (and transmit roughly ½ of the total available light), but such prior art must also employ two polarizing films which also absorb more than half (~60%) of the remaining available light. Thus, only about 25-30% of the available light makes it through the combination of notches plus the two Polaroid films. Such a prior art colorblind correction filter would absorb and waste ¾ths of the available indoor artificial light, which would be most unacceptable. Taking large amounts of light away from colorblind people is exactly the wrong thing to do. Compare the prior art to the present invention (FIG. 14 embodiment), which can preserve about 85% of the total available indoor artificial light while correcting indoor colorblindness. That's also true for spectacle-less artificial bright colorblind lighting, as well as colorblind vehicle windows. The present colorblindness invention would express an almost undetectable very mild tint, not a dark lens or a dark window film. The present invention can deliver 3 times more indoor light to colorblind people while consuming much less electricity.

In accordance with another embodiment of the invention, blurry chromatic aberration caused by human chromatic lens defects, not retinal defects, is discussed above with respect to FIGS. 5-5C, and naturally occurs in the blue and red spectrums and not in the 540-550 nm peak retinal detection zone. This defect can also be compensated for to provide enhanced vision in accordance with the present invention. FIG. 18 depicts at 150 the transmission vs. wavelength characteristics of light passing through dark sunglasses (or other eyewear, both prescription and nonprescription) incorporating multiple narrowband absorption dyes sculpturally combined to absorb incident light in multiple wavelength zones generally indicated at 152 and 154. These dyes are selected (or sculpted) to absorb substantially all the wavelengths except those at the primary high transmission zone 156 centered at the peak 540 nm retinal sensitivity zone. To be clear about narrowband transmission versus narrowband absorption, if numerous overlapping narrowband absorption dyes are incorporated in or on a substrate, then the entire spectrum can be absorbed and the substrate can appear nearly black. But if the dyes absorb the entire spectrum except for one small spectral segment, the result can be one narrow transmission band; for example a narrow green-yellow transmission band aimed at eliminating human lens chromatic aberration (blurring), and thus, provide much better than perfect 20/20 vision.

It should be noted that a single 540 nm narrow transmission band is not the only wavelength that can be sculpted in accordance with this embodiment of the present invention; the invention generally teaches narrowband absorption-sculpting and narrowband transmission of any one or more desired transmission band or bands. The purpose of this sculpturing of the transmitted wavelengths is to significantly enhance visual acuity by significantly reducing chromatic blurring. The transmission spectrum 150 produces better than 20/20 vision with sunglass optics, providing a primary narrow transmission band 156 at about 540 nm, which allows humans to more sharply focus small objects at much greater distances. For example, a person with narrowband green-yellow 20/10 sunglass vision, provided by the band 156 of FIG. 18, would be able to sharply focus small objects at distances of 200 feet, whereas a person with "perfect 20/20" vision would have to move from 200 feet to 100 feet to sharply focus the same small objects (See the FIG. 5 eye chart). This example is not meant to suggest that vision-correction lenses are not needed. Prescription eyeglasses, contact lenses, and/or surgical vision correction are still necessary for some 60% of the population. This invention can produce the above phenomenal vision focus improvements beyond 20/20 vision after, or if combined with, prescription optical correction optics.

FIG. 18 optics would be an excellent choice for golfers, baseball players, spectators, and target shooters, but not for vehicle drivers, for this narrowband single transmission optics (not narrowband absorption optics) would prevent the user from seeing red objects, such as red traffic lights, which would appear black. FIG. 18 narrowband green-yellow transmission optics would allow green and yellow traffic light vision and can be readily sculpted to include a small red transmission band 160, marked "preferred red transmission" in the Figure, to provide the legal minimum amount of red light for highway vehicle drivers. The red-objective here is safety, not visual acuity. The vast majority of "far better than 20/20 vision" is preserved by the very narrow transmission band 156 centered at about 540 nm. Thus, normal red chromatic blurring would be exceptionally negligible compared to diopters of blue chromatic blurring, and the present invention further reduces red transmission by about 5 to 10-fold in intensity to render red chromatic blurring to an almost undetectable red halo. Therefore, the present sunglass embodiment is very appropriate to sportsmen and vehicle drivers, and provides dark sunglasses which only allow one narrow transmission band of light at 540 nm, plus a negligible amount of slightly blurred red transmission for safe traffic light vision, to yield much better than 20/20 vision. Significantly improved visual acuity, as described above, represents a marked competitive sports advantage for athletes and spectators. Those with only 20/20 vision would suffer a marked sports disadvantage. Users would be able to read traffic signs as much as twice as far away. The overwhelming feature of FIG. 18 optics is the super high visual acuity to more clearly focus objects at much greater distances, although such optics do not correct colorblindness because FIG. 18 is not a full spectrum product.

Other embodiments of the present invention contemplate full spectrum vision plus improved visual acuity better than 20/20 vision. Thus, as previously indicated, there are many longwave, broadband, sharp cutoff material examples such as broadband UVA and UVB dyes (to protect eyes from damaging ultra-violet rays), which transmit the entire visible spectrum. Other sharp-transition broadband dyes not only absorb UV wavelengths, but blue wavelengths as well—such as depicted at 162 in FIG. 18, or red wavelengths as depicted at 164. These broadband, sharp transition dyes can be employed in combination with other dyes without departing from the sculpting theme of the present very narrowband dye invention. Thus, some broadband absorber materials which exhibit sharp absorption transitions on their longwave sides (see FIG. 18, dye broadband absorber 164) or on their short-wavelength sides (see FIG. 18, dye broadband absorber 162), can be combined with one or more of the very narrowband sculpting dyes depicted by wavelengths 152 and 154 of FIG. 18.

The embodiments of the invention in which multiple absorption dyes, instead of a single dye, where just one broadband long-wave sharp cutoff dye indicated by band 162 plus just one broadband short-wavelength sharp cut-on dye indicated by waveform 164 are combined to produce one narrowband transmission band 156 centered at about 540 nm produce exceptionally chromatic aberration-free vision, but such single bandpass lenses must never be used for highway driving because little to no red traffic light transmission would be present, as noted above. Such a single transmission bandpass filter would be useful for precision target shooter telescopes and the like, but not highway driving. Prior art non-sculptable bandpass glass optics (not plastic) exist, such as by Gibson et al (1935) and gelatin narrow bandpass filters by Ilford et al in 1960. However, no one prior to the present invention has been able to sculpt a multiple narrow bandpass absorption filter at almost any visible wavelength.

In general, the present invention utilizes combinations of narrowband absorption dyes which exhibit unusually sharp cut-on and cut-off absorption slopes at different wavelengths. That feature allows narrowband dyes to more precisely and more flexibly sculpture almost any desirable transmission bands—not just for FIG. 18 embodiments, but also the other almost infinite number of embodiments contemplated by the present invention. By "embodiments" is meant various single narrowband transmission optics for better than 20/20 vision, centered not just at 540 nm, but sculptured to almost any ideal wavelength, and exhibiting unusually sharp cut-ons and cut-offs. Moreover, two or more transmission bands can be sculptured with different wavelengths to yield lenses having a slightly off-white hue. Furthermore, narrowband dyes and sharp slope broadband dyes can be combined to also achieve the sculptable spirit of the broad reaching invention.

Common conventional very broadband color dyes which typically transmit 100 nm to over 300 nm bandwidths are not in the spirit of the present sculptable invention. The millions of such conventional dyes cannot totally eliminate blurred chromatic aberrations, and cannot produce vivid high color-contrast full spectrum vision. For example, a typical very broadband yellow-transmitting or orange-transmitting dye actually transmits an approximate 200 nm wide spectrum consisting of most of the green spectrum and the entire red spectrum—only blocking the blue and some of the green spectrum. Such a common broadband yellow or orange dye cannot render white (full spectrum) images, cannot adequately block broadband intense sunlight, and cannot eliminate blurry red chromatic distortion. Even if broad spectrum (neutral color) grey dyes are added to broadband common yellow or orange dyes to achieve dark yellow or dark orange sunglasses, vision remains impaired. The same shortcomings apply to all prior art broadband dyes and dye combinations. Broadband dye spectral sculpting is nearly useless and has remained relegated to fashion coloring, not improved vision.

Figure 19:
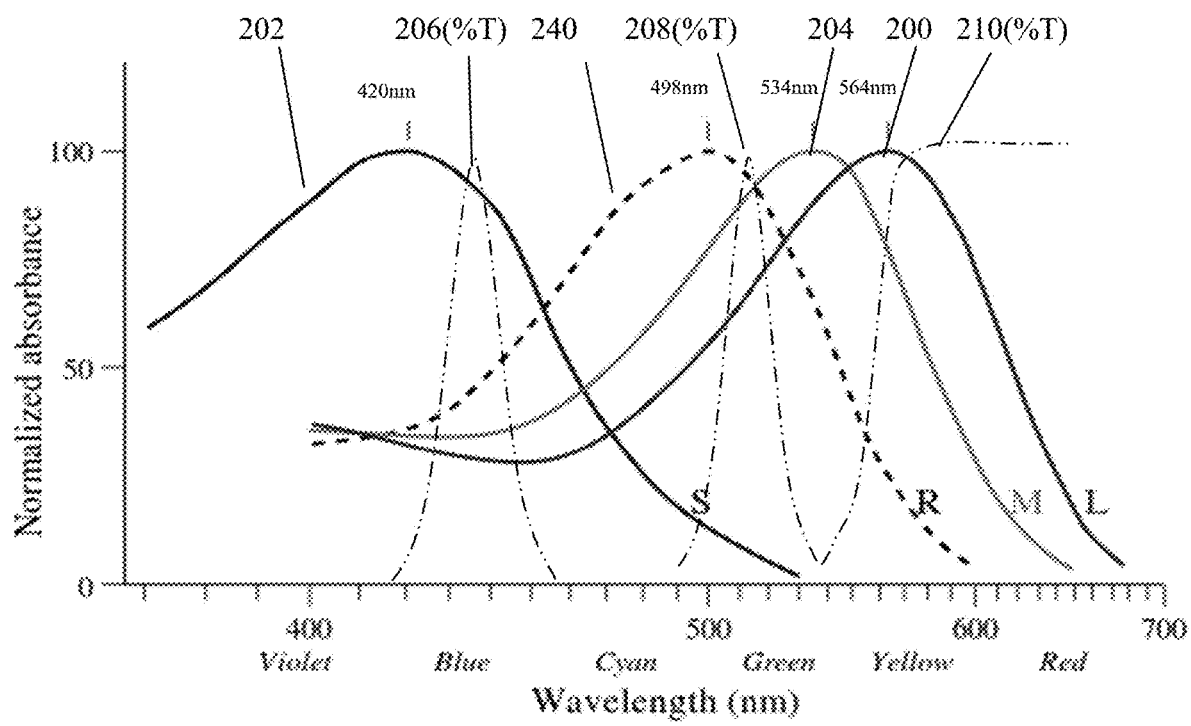
Figure 20:
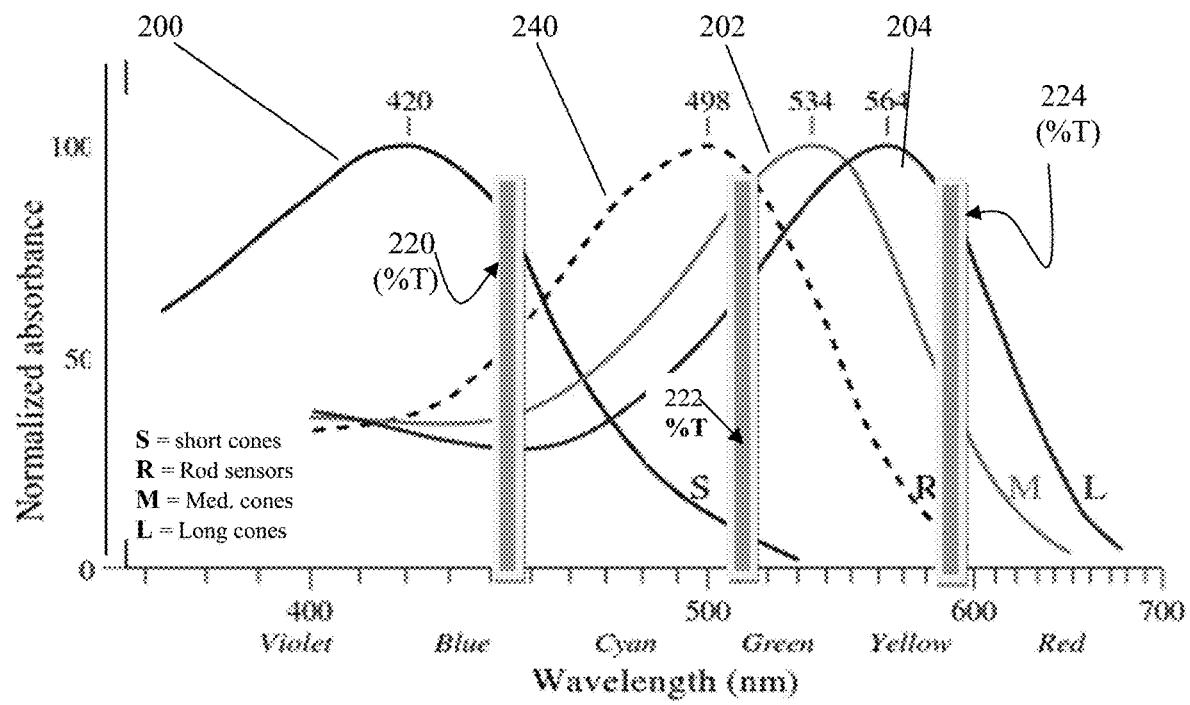

FIG. 19, a spectral graph, and FIG. 20, a block diagram version of FIG. 19, illustrate the preferred triple narrowband transmission characteristics for both sunglasses and dark thin film window glazing type filter embodiments of the invention, showing how totally colorblind-rod spectral responses can be minimized; how to minimize the bulk of bright sunlight glare; how to simultaneously block a narrowband 560 nm notch to correct red-green colorblindness; all while creating enhanced color vision for everyone. Graphs 19 and 20 also depict the spectral characteristics of a much better-than-20/20 single narrowband filter option centered around 500 nm to 590 nm for enhanced acuity and focus in eyewear, scopes, windows, flashlights, and the like, and which can optionally include a sculpted red transmission band to allow the user to see red traffic lights. More particularly, FIG. 19 illustrates blue, green and red retinal absorption, or retinal sensitivity, bands 200, 202 and 204, respectively, representing the sensitivities of normal RGB retinal sensors (see FIG. 11). Superimposed on this retinal absorption graph is illustrated at 206, 208, and 210, respectively, the three preferred narrow light transmission bands desired for triband full spectrum sunglasses and triband full spectrum windows. As discussed above, these transmission bands are centered at about 450 nm, 530 nm, and 600 nm, as illustrated further by corresponding blue, green and red transmission blocks 220, 222, and 224 in FIG. 20. Also note in FIG. 19 that this dark appearance, full spectrum embodiment of the present invention intentionally locates a narrow absorption band between transmission band 208 and transmission 210 at about 560-580 nm to correct colorblindness. The same effects are depicted in block form in FIG. 20. In other words, dark windows and dark sunwear can serve three functions simultaneously—namely, block bright sunlight, dramatically enhance color vision for everyone, and correct colorblindness.

It is helpful to note that the present invention contemplates, for the FIG. 18 embodiment that produces better than 20/20 vision, the use of several dyes selected and sculpted to block all incident light except transmission band 156 in the yellow-green part of the spectrum. By extending the same line of thought, the nearly infinitely flexible nature of the present invention's rare and customizable dyes can sculpt essentially any desired unique single, double, triple or other multiple narrowband transmission combinations, depicted in FIG. 20(a). Similarly, if just one or two narrowband absorption dyes are employed to absorb a notch band of wavelengths surrounding ~560 nm, then high overall light transmission across the whole 400 nm to 700 nm visible spectrum will result (nearly clear lenses) while also distinctly separating the red and green retinal wavelengths, and thus correcting the vast majority of colorblindness with nearly clear optics (not dark sunwear type optics). In the broadest sense of the present invention, it is even possible to custom manufacture notch spectral absorption lenses to more perfectly match and correct odd and atypical individual colorblind retinas. The latter ability is made clearer by recalling that narrowband dye manufacturers (previously cited) have the ability to slightly modify their individual molecular dye structures to shift their individual dye narrow absorption bands to create a wider variety of narrowband dyes as symbolically depicted in FIG. 20(a), wherein bands 212 through 219 depict peak absorption wavelengths, 214 depicting the transmission band between pairs of narrow absorption bands, and 216 and 218 depicting how each narrow absorption bandwidth can be widened or narrowed by increasing or decreasing the concentration of each dye. According to the wide-ranging teachings of the single narrow transmission band 156 concept in FIG. 18, the central transmission wavelength can be located at essentially any other narrow transmission band wavelength for other surprising applications such as, and not limited to, covering red and green incandescent traffic light fixtures, in order to emit narrowband red and narrowband green light for colorblind highway drivers. Such a very inexpensive application would be much less expensive than converting intersection traffic lights to narrow band LED traffic lights.

The standard retinal sensor types responsive to the several bands are identified in FIGS. 19 and 20 by "S", which means "short", for sensors responsive to waveform 200 peaking at 420 nm; "M" which means "Medium", for sensors responsive to waveform 202 peaking at 534 nm; and "L" which means "Long", for sensors responsive to red waveform 204 peaking at 564 nm. The response characteristics of the highly responsive black and white retinal rod sensor types which respond to a broad spectrum of light are indicated at "R", curve 240 peaking at 498 nm. The ratio of the rod vision area defined by curve 240 to the total area under the three blue, green, and red transmission curves 200, 202 and 204 can be improved by the present invention. Thus, some of the very broad bands of black-and-white rod signals can be reduced more than the integrated "R", "G" and "B" color signals. In other words, considerably weaker black and white signals can be generated by the rod sensors, while not attenuating as much the R, G, and B cone signals. This leads to more vivid or higher contrasts of full spectrum sunglass color vision without the need of prior art fragile delaminatable narrowband interference films. Note the similar several additional spectral achievements of the present invention compared to the prior art; namely, the narrow "notch" filter at about 560 nm to correct green-red colorblindness, plus the higher resulting net light reaching the retina.

FIG. 19 illustrates the ability of the present invention to sculpt and reduce a large part of the spectrum that would normally activate the very broad, super-sensitive, but completely colorblind retinal rods which peak at about 498 nm and are exceptionally broadband (400 nm to 600 nm) detectors, as illustrated at curve 240. The "normalized" FIGS. 19 and 20 spectral curves are deceptive. As previously emphasized, retinal totally colorblind rod sensitivity is several times (about 5 times) more sensitive than cones. If FIG. 19 were depicted on a relative scale (not a "normalized" scale), the very broad 498 nm rod band 240 would tower over the three 420 nm, 534 nm, and 564 nm cone bands 200, 202, and 204, respectively. Colorblind rod signals produce undesirable black and white images which overwhelm weak color scenes. Color detection and color contrast images under Mesopic (medium light levels or, even very dark sunglass conditions), tend to "grey" images under weak light conditions. The area under the exceptionally sensitive 498 nm rod detection band 240 would overcome and dominate much of the color detection area under the color vision cone curves. Cone vision is severely impaired by weak light and by dark sunglasses. But the present invention employing three narrow transmission bands 220, 222, and 224 can greatly absorb much of the 498 nm broad spectrum between bands 220, 222, and 224. In other words, most of the highly sensitive rod detection wavelengths that ordinarily see black and white images would not be stimulated, and would not be as activated. Cones would receive a relatively higher percentage of RGB transmission light. In particular, see the wide band of light in FIG. 20 between transmission band 222 and 224 which is absorbed and does not activate rods from about 460 nm to 510 nm. Very little of that band of light makes it to the extremely sensitive rods. That in turn, increases the ratio of blue and green cone signals compared to rod signals. More colorful color vision is possible. The result is an increased ratio of integrated-cone-signals-to-integrated-rod-signals, and thus, more vivid color vision becomes possible, instead of color-impaired grey Mesopic vision. FIG. 20 is an over-simplified illustration of a dark (10% average transmission) sunglass version of this invention and illustrates how the present invention employs transmission band narrowing plus rod blocking to achieve dark but more vivid sunglasses instead of prior art attenuation of the entire white light spectrum. Note how ~90% of the white light and rod wavelengths are blocked and yet, ~80% of the high contrast narrow bands of blue (220), green (222), and red (224) transmit intense colors to cones to yield enhanced color vision during bright sunglass days. See FIG. 1 to appreciate the complex mental "contrast" vision illusions. Thus, by employing selective and sculpted transmission band narrowing, several retinal advantages are simultaneously created: 1) Reduced rod stimulation improves mesopic color contrast vision and extended color vision into early and late-day hours for normal vision people; 2) dark sunglass color contrast vision for the colorblind is enhanced on bright sunny days; 3) no prior art incident angular color changes take place, and; 4) full color spectrum perception of reds, yellows, greens, magentas, whites, and blacks can be preserved. Note that FIG. 20 not only provides higher color-contrast sunglass vision for 7 billion normal people (see FIG. 2), but also enhances color vision for the 470 million colorblind population.

Surprising vision is possible in the mesopic (weak light) domain. Proper filtering, as depicted in FIG. 19, creates an improved cone-to-rod ratio electrical signal contrast in the eye for color-enhanced eyeglasses. It also creates improved viewing to the outdoors from indoors when the present invention is used to as a dark window glaze, which happens to also color-enhance indoor solar illumination of room widows that are glazed by the present invention. More vibrant indoor true color items can be seen even by color-blind people under narrowband absorption-filtered (glazed) daylight. Although the present invention does not apply to some colorblind people who are genetically completely devoid of one or all three red, green or blue receptors, it is certain that the present invention can markedly improve visual acuity for most colorblindness. Moreover, it is equally certain that the present invention can simultaneously markedly improve vibrant color vision and human productivity for almost everyone.

Dissolvable narrowband dyes, especially if dissolved in non-toxic, hot solvents near 100° C., permit several mixtures of narrowband tinting by retail optician eyewear dispensers to transform clear plastic lenses, such as CR39 lenses, into vibrant color-enhanced optics, especially valuable for most colorblind or color-deficient people. Optionally, opticians can dramatically color-enhance the vision of non-colorblind population who wear prescription or non-prescription eyewear. Narrowband dyes are known to be soluble and dispersible in many polymers, monomers, nontoxic and non-flammable oils, and preferably, in surfactant-based super-non-toxic hot water solutions. Thus, opticians, armed with several discrete narrowband tinting dye cocktails of the present invention, can custom-correct different kinds and degrees of colorblindness, in a matter of minutes, while the patients wait. Likewise, opticians, armed with many of the other variations of the present invention, can produce enhanced sunglass color vision, and even produce better than "perfect 20/20 vision" for existing prescription spectacle patients plus non-prescription patients. Moreover, even soft and porous contact lenses can be mildly pre-dyed with narrowband dyes to produce highly transparent contact lenses which create more vibrant color vision. The mere parts per million dye chemicals needed in contact lenses of the present invention are not water soluble unless surfactants are added to water, and the dye chemicals are also non-toxic, and thus, should be safe to prescribe to contact lens patients.

By extension, and similar to optician lens tinting above, thin film window glazing polymers can be custom tinted with hot narrowband cocktail solutions of the present invention—preferably by way of water based surfactant custom dying. The latter option opens an endless variety of custom field-tinted building and vehicle window options including multiple (overlapping) transparent pull-down window-shades that color-enhance, that sharpen 20/20 vision, and/or that markedly enhance labor productivity, block polarized light, and an almost endless similar combination of pull-down shade optical effects.

Another surprising mesopic vision enhancement can be deduced from the above. A vastly superior single 530 nm to 550 nm greenish-yellow LED emission flashlight/spotlight/headlight embodiment is possible. As discussed with respect to FIGS. 15, 16, and 17, narrowband LEDs in the 530-550 nm wavelength regime are available. But no one would ordinarily choose a narrowband greenish-yellow LED for flashlights because most people make the mistake of assuming that white light flashlights render color vision at great distances. That is a very flawed assumption. Distant objects illuminated by white light return (reflect) only exceptionally weak scotopic (strictly black and white) rod retinal images. Essentially no colors whatsoever. The human mind tends to produce illusionary color images that are not detectable by retinal color cones. Most of the very dim blue and the red spectral light returning from a white flashlight would fall on inactive cones, would also be significantly chromatically blurred by the human lens, and only rods would be active at low light levels. No blue, green, or red cones would be activated under such very weak and distant night vision conditions. Thus, a single narrowband greenish-yellow 530 nm or 550 nm LED light beam would actually return detectable light and would, by far, produce the sharpest focus and the brightest detectable light—all of which would also greatly extend flashlight battery life. A 520-550 nm narrow emission band LED flashlight is the very best for rendering the best distant un-aided night vision images. The sharpest focus would be green-yellow light but the highest rod sensitivity would be 498 nm. Thus, 520 nm LED light would be a good compromise that even colorblind absorption optics (560 nm) would not block. Another convenience flashlight would be a switchable white LED for close-up color vision switched to 498 nm emission blue light for the greatest distance scotopic (peak sensitivity) rod vision.

Figure 21:
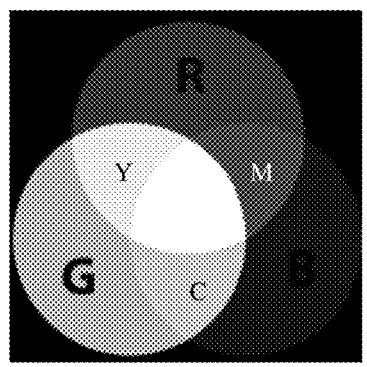
FIG. 21 illustrates commonly understood additive light combinations, and FIG. 22 common subtractive primary pigment combinations.
Figure 22:
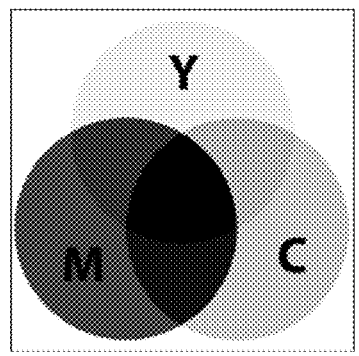

Thus far, the present invention has largely addressed novel sculpted narrowband absorption filtering that happens to also enable sculpting of narrow transmission bands of light. That type of contrast color intensification is referred to as additive color perception, depicted by FIG. 21, which illustrates that if primary red, green and blue (RGB) light is added before reaching the eye, white can be perceived. Additive wavelength color-mixing is created by adding two or more wavelengths of light before reaching the eye. Red, green, and blue are the additive primary wavelengths used in additive color systems such as eyewear, lightbulbs, projectors and computer terminals. As can be seen in FIG. 21, yellow light is merely the addition of green light and red light. But it should be emphasized that pure yellow wavelength light does exist, not just green plus red. Another classic world of subtractive colors is depicted in FIG. 22, illustrating how yellow, magenta and cyan (Y, M, and C) primary chemicals can be subtract colors from reflected white light before reaching the eye, as do paints. Black light (or more accurately, no light) can be produced by subtractive color techniques. The primary subtractive colors of yellow, magenta, and cyan, have wide applications in paints, inks, and clothing. Note that there is no such thing as a single "magenta" wavelength in a white light spectrum. True yellow light does exist in a pure white light spectrum; thus, yellow plus magenta plus cyan light does not produce "black light." Black is the total absence of all colors of light.

Previous color vision discussions herein all encompassed transmission and absorption optics. In the case of inks or paints on white paper (for example), incident white light illumination of a narrowband transmission ink or paint must first pass through the material, and all wavelengths are absorbed by the narrowband material before the remaining narrowband light is reflected by the white substrate paper and received at a retina as a single true narrow band of color. Broadband reflective pigments cannot reflect narrow bands of light. Thus, narrow reflective color bands of light can produce yet unimagined printed color images unique to the present invention. It has been pointed out throughout this document that exceptionally narrowband absorption dyes can be sculpted to produce unexpected enhanced vision, including colorblind remedies and more vibrant normal vision. Similar surprisingly vivid color contrasts occur if narrowband inks of the present invention are deposited on white paper, as depicted in FIG. 23.

Figure 23:
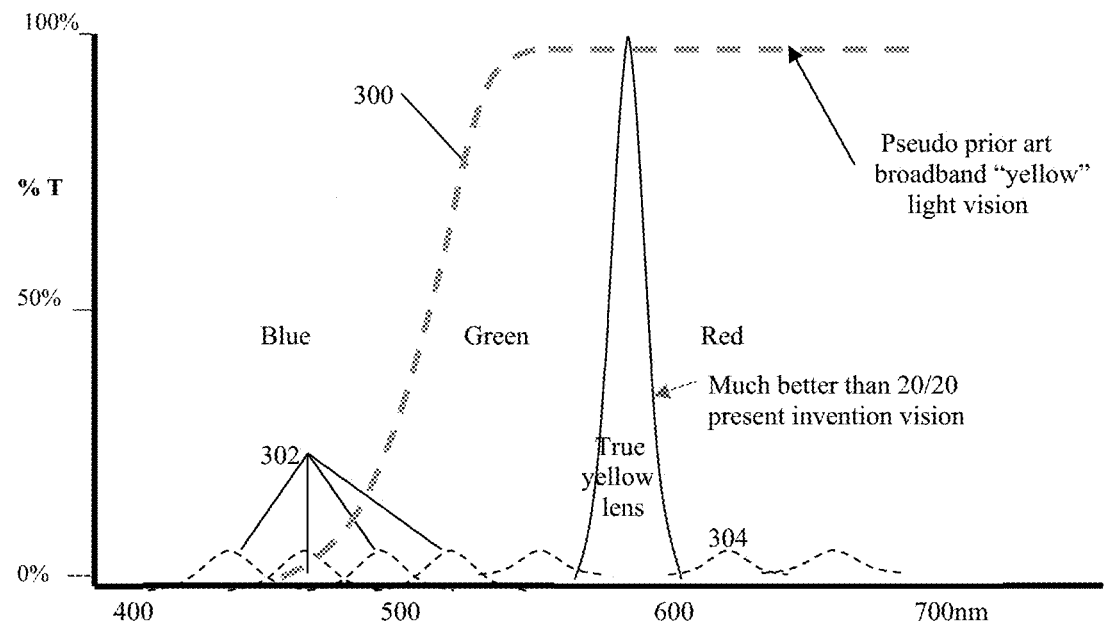
FIG. 23 illustrates a subtractive spectrum for just one ultra-narrowband true yellow wavelength ink which employs several highly absorbing dyes at other-than-yellow wavelengths, wherein the ultra-narrow band true yellow wavelength ink is compared to prior art very broadband green-red reflective pigments which only appear in the mind as yellow light.

FIG. 23 graphically depicts a very broadband green-red prior art yellow ink depicted by spectral curve 300, which is perceived as "yellow ink" on white paper. Also illustrated is the response of white light impinging on white paper which is all absorbed by multiple dyes having narrow wavelengths 302, except for one narrowband of pure 580 nm yellow light 304, which light is reflected by the white paper. That true yellow light, present in white light, can transmit through the ink and impinge on the white paper, followed by a near total reflection from the white paper, and again transit for a second time through the ink, to appear at a retina as pure narrowband yellow light. This narrowband yellow ink example markedly differs from the prior art broadband yellow ink depicted by spectral curve 300, which is also perceived as "yellow ink" but such prior art broadband yellow ink is actually composed of considerable amounts of green, yellow, orange, and red light. The present invention can sculpt true narrowband spectral ink colors, using several narrowband absorption dyes, not pseudo colors. Moreover, the present invention inks allow the creation of an infinite array of unique ink colors never seen by a human eye before, not just the yellow ink example depicted in FIG. 23. Ultra-deep blue narrowband inks centered at about 400 nm (not depicted) at the very edge of retinal detection, can be produced by the present sculptable ink invention. Almost any truly unique hue of blue, green, yellow, orange, red, magenta, and cyan ink can be produced by those skilled in the art by employing the teachings of the present invention. An infinite number of unique high security ink applications abound. In addition, if three primary colors (blue, green, and red) of narrowband inks are employed to print color images, then very high color contrast matrix-dot images can be produced, similar to human vision images depicted in enhanced photography in FIG. 3E. Printed matrix dot color images containing colors never seen in print before become possible. Matrix dot printed images can appear to the eye as more vibrant than the original scene colors. For example, if a real scene contains a very deep 400 nm blue object, no prior art broadband typical 480 nm blue ink can reproduce such an original 400 nm blue color scene. It follows that narrowband ink dots having a 560 nm absorption notch property, can be matrix dot printed to compensate for colorblindness and render full color images for the colorblind as in FIG. 3A. Without offering fine detail here, it should be apparent from the foregoing, to those skilled in the art, that colorblind subtractive paints can also be engineered to render corrected color images for the colorblind. Nevertheless, single narrowband color paints of any wavelength can be painted on white surfaces to render vivid high contrast single colors not previously perceived by any prior art paint, especially if painted adjacent to each other for maximum contrast comparison. And of course, narrowband matrix dot printed images can be printed on white backgrounds to render vivid high contrast images (FIG. 3E) also never perceived before on white background paper, posters, on white highway billboards or, on photographic film projections.

Figure 24:
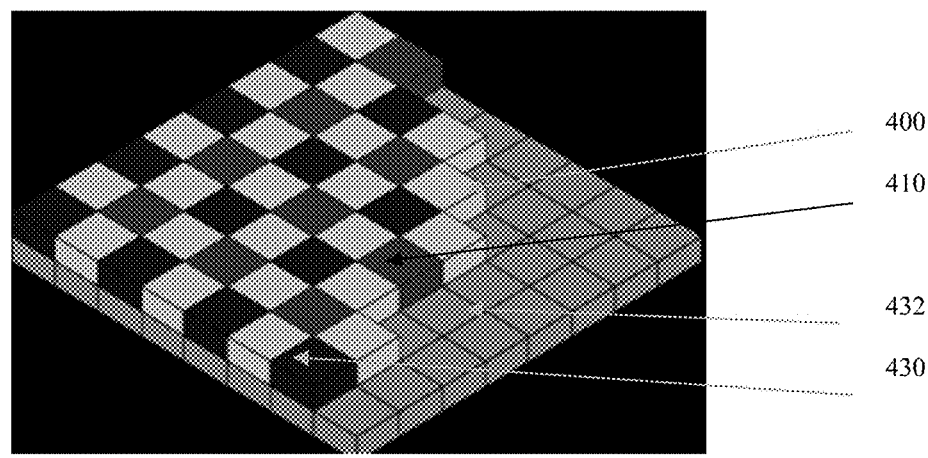
FIG. 24 illustrates an opaque substrate common prior art Bayer digital color camera filter, which historically employs relatively broadband RGB transmission filters for each RGB solid state light detector, such prior arts consuming much higher battery power than would be the case with the present narrowband filter present invention.

The previous discussion about high color contrast matrix dot printing of narrow red, green and blue narrow transmission bands (FIG. 23) opens one more matrix dot type giant application in active (electronic) digital color vision sensor devices, which are presently in extremely wide use in photographic digital cameras, cell phones, and numerous other video devices. Almost all prior art electronic (active) image sensors employ broadband red, green, and blue dyes and pigments similar to the 1976 Bayer color filter, (U.S. Pat. No. 3,971,065) by Byran Bayer (Eastman Kodak company) illustrated in FIG. 24. FIG. 24 depicts one of many common prior art Bayer digital color camera filter schemes which historically employ relatively broadband RGB transmission filters 400, 410, and 430 for each RGB solid state light detector 420, or sensor "pixel" which serves as a substrate for the filters. The prior art color pixels essentially are not much more than a nano-droplet of transparent ink on each of the millions of individual solid state sensors. Such prior art broadband color filtering in FIG. 24 produces relatively poor contrast color pixels and images, which must be restored by elaborate computerized electronic luminosity (brightness) and chromaticity (color) pixel microprocessing called "mosaic image reconstruction". Thus, all digital cameras use high clock-speed digital algorithm color reconstruction micro-processing to accurately restore color pictures and video images, and such high clock speeds require proportionally higher electrical power (battery) consumption. Clock speeds are directly proportional to battery power consumption. Thus, 10 times higher clock speed microprocessing consumes 10 times more battery power.

Instead of the broadband prior art filters illustrated at 400, 410, and 430, ultra-narrowband dye transmission filters of the present invention may be used to simplify electronic mosaic image reconstruction, when the submicron size dots 400, 410, and 430 incorporate the narrowband dyes depicted in FIG. 20. The resulting individual matrix-dot-like (400, 410, and 430) pattern of narrowband dyes is dissolved into polymeric pixels to produce each of the single narrow transmission wavelength transmission pixel dots of narrowband green, narrowband red, and narrowband blue transmission pixels. Such narrow band pixels are applied to the substrate solid state sensor pixels 420 using techniques known in prior art solid state digital sensor and camera manufacturing. The use of the narrower bandpass dye cocktails of the present invention for high contrast filters reduces the need of elaborate microprocessing mosaic reconstruction and also permit enhanced color. Thus, lower microprocessor power consumption is one video benefit of the present invention. Unique digital color scenes are another benefit. Accordingly, wider bandpass prior art Bayer filtration and elaborate microprocessing can be improved with the present narrowband sculpting invention.

Figure 25:
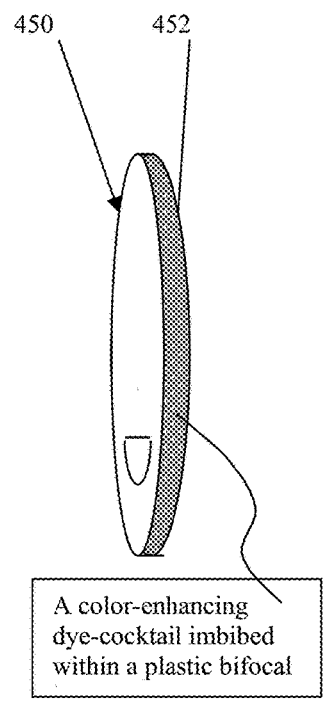
FIG. 25 illustrates a transparent substrate, such as a plastic substrate used for typical eyeglasses, which incorporates suitable multiple dyes in accordance with the invention.
Figure 26:
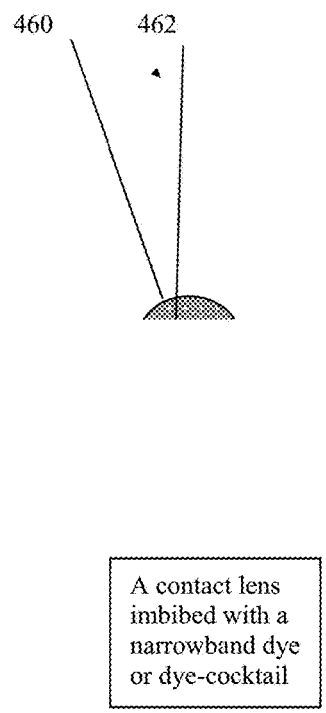
FIG. 26 illustrates a substrate such as a transparent plastic substrate used for contact lenses which incorporates suitable multiple dyes in accordance with the invention.
Figure 27:
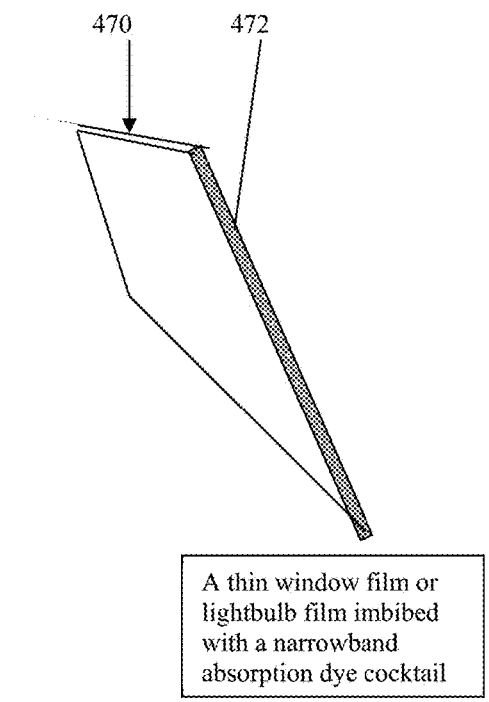
FIG. 27 illustrates a transparent substrate such as a thin film which incorporates suitable multiple narrowband absorption dyes in accordance with the invention.

FIG. 25 illustrates a typical substrate 450, such as a CR39 plastic substrate used for typical eyeglasses, which incorporates one or more suitable narrowband dyes in accordance with the invention and internally indicated at 452. Similarly, FIG. 26 illustrates a substrate such as a contact lens 460 incorporating one or more suitable narrowband dyes indicated at 462, while FIG. 27 illustrates a window thin film 470 also incorporating a suitable dye or dye combination 472, as described above. The cited narrowband dyes can be melted and mixed into hot polymers or monomers prior to extrusion or prior to casting; can be dissolved with or without surfactants into a wide variety of solvents and then added to clear polymer substrates to be cast or injection-molded into final parts; can be chemically absorbed into optically clear substrates (such as hot tinting or pressure injection), or by other known processes for incorporating dyes or combinations of the dyes described hereinabove into suitable substrates, all without departing from the spirit of the present invention. Dissolvable narrowband dyes, especially if dissolved in non-toxic, hot solvents near 100° C., permit several mixtures of narrowband tinting by retail optician eyewear dispensers to transform clear plastic lenses, such as CR39 lenses, into vibrant color-enhanced optics, especially for most colorblind or color-deficient people, thereby offering an instant colorblind remedy for most of the almost ½ billion colorblind. Optionally, opticians can dramatically color-enhance the more than 1 billion non-colorblind population who wear prescription or non-prescription eyewear. Narrowband dyes are known to be soluble and dispersible in many polymers, monomers, non-toxic and non-flammable oils, and preferably, in surfactant-based super-non-toxic hot water solutions. There are millions of broadband dyes and pigments, but there are only a rare few handfuls of narrowband visible spectrum absorption dye chemicals, such as those previously cited herein. It must be emphasized that the molecular structure of these dyes can be custom-modified to shift their spectral absorption peaks so that the present invention is not limited to those few dozen currently published and commercially available dyes, while fully retaining the broad spirit of the present invention.

In accordance with the invention, all future clear lenses can have either a slight or pronounced 560 nm narrowband notch "tint" to yield an almost undetectably clear tinted lenses, and yet, more vivid greens and reds for everyone—normal and colorblind people. The basic starting polymer resin (diethyleneglycol bis allylcarbonate) from which all very popular CR39 lenses are made, can be briefly heated to well over 200 C—a temperature which would melt most narrowband dyes. Thus, if notch dyes are melted and dispersed in CR39 monomer resins prior to casting and cross-linking the starting resin, then all CR39 lenses can have a nearly invisible narrowband notch filter inserted, despite the fact that finished prescription lenses vary in finished thickness. CR39 manufacturers can vary the narrowband concentration in each of their many "base curve" blanks ("hockey pucks") in anticipation of the average finished (ground and polished) lens thickness that will result from each base curve blank. The same is true with other than CR39 materials, such as impact-resistant polycarbonate lens materials, which happen to readily dissolve the present narrowband dyes at elevated temperatures. It is now clear that just one version of dark non-prescription sunglasses such as that illustrated in FIGS. 19 and 20 can be manufactured so that it will correct colorblindness, while also providing normal vision people with dramatically more vivid greens, reds, and blues. Thus, one manufactured sunglass lens can serve everyone. Those skilled in optical arts will recognize that the present invention can be combined with essentially all known prior art vision technologies such as photochromic self-darkening optics, fashion color tinting practices, anti-reflection coatings, polarizing optics, scratch-resistant coatings, thermo-optical darkening chemicals, electro-optical technologies, gasochromic windows, liquid crystal optics, without limits, and without departing from the spirit of the present invention.

Moreover, since human color vision is indeed such a profound wonder, and includes so many variations, as has been illustrated throughout this document, there is also no question that the sculpted multi-band spectral wavelength examples provided herein can all be readily shifted to shorter or longer wavelengths to obtain individualized optimal high contrast net transmission hues without departing from the spirit of the present invention. It has also been pointed out that no one narrow band chemical dye is known to possess multiple narrowband transmission bands capable of meeting the color vision objectives of the present invention. It is well known to those familiar with these spectral arts that higher or lower dye concentrations produce higher or lower spectral absorption plus wider or narrower bandwidths—all of which properties are contemplated in the present multiple sharp transition, narrowband invention. In the spirit of the present invention, specific dyes and specific preferred dye wavelengths can be varied to shorter or longer wavelengths, with much higher or lower concentration, including larger numbers of individual narrowband dyes, without materially departing from the spirit of the present invention.

Figure 20A:
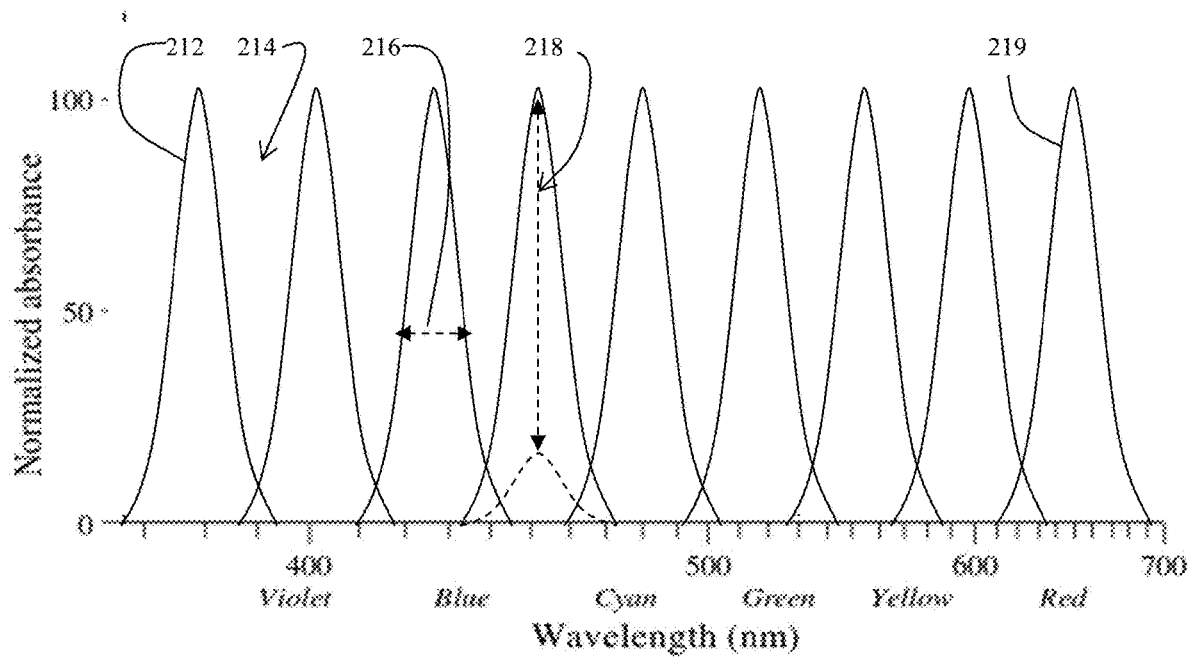
FIG. 20a illustrates the wavelength bands of a cocktail of multiple narrow-absorption-band dyes combined to produce a selected narrow transmission band.

The forgoing has endeavored to make clear the uniqueness and surprising results in employing one or more narrowband absorption dyes to sculpt the visible light spectrum prior to the light reaching the retina. As described, the term "narrowband absorption dye" means a dye which exhibits a strong absorption over a narrow spectral band, typically less than 20 to 60 nanometers wide, similar to the many hypothetical absorption dyes 212 to 219 depicted in FIG. 20*a*, and more particularly illustrated at 216. Only a few dozen such exceptionally narrowband absorption dyes exist out of millions of other known ordinary broadband absorption dyes. The present inventor has recognized that very durable narrowband transmission filters can be fabricated (sculpted) by combining multiple narrowband absorption dyes. For example, FIG. 20*a* illustrates a full visible spectrum scattered with many hypothetical narrowband absorption dyes 212-219—each depicted absorption band having an unusually narrow absorption bandwidth of about 30 nm. As noted in this Figure, combining multiple narrowband dyes can create very desirable equally narrow transmission bands at almost wavelength, such as transmission band 214. Likewise, the same narrowband absorption dyes can be combined to create notch filters for colorblind people; multiple transmission band filters to greatly enhance color vision that also increases human productivity; and even narrowband vision capable of better than 20/20 perfect vision; plus a host of other optical device applications and unique inks, as described above.

Figure 28:
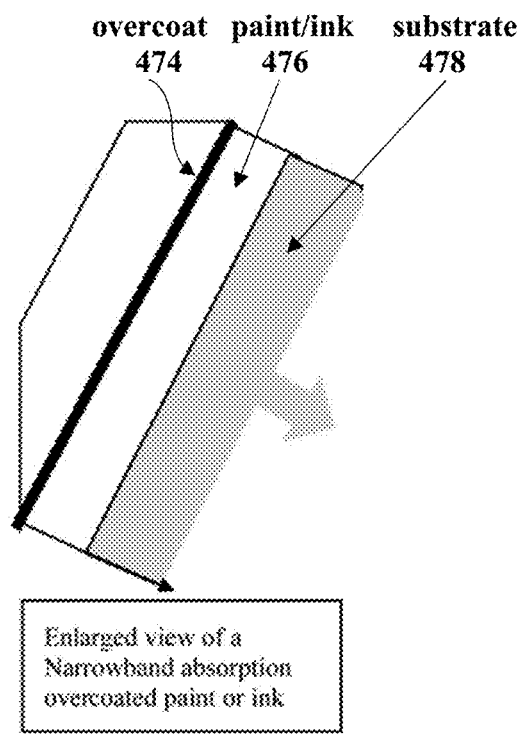
FIG. 28 illustrates a thick opaque substrate, such as paper, wood, or metals, which is painted or printed, and then overcoated with a very thin transparent outermost coating containing suitable narrowband absorption dye(s) of the present invention.

Also, as previously stated, and as illustrated in FIG. 28, another embodiment of the present invention includes a notch overcoating applied to colorful paints and inks and photographs to render more vivid colors for everyone, and especially render color vision to the approximate 470 million colorblind and color-impaired population—and requiring no eyewear. Speaking only in terms of the paints and coatings industry (not inks), according to Tikkurila Corporation in Finland, the global annual value of protective and decorative paints and coatings is about $130 billion. Broader applications such as inks, and not limited to printing and photography, further increases the commercial industry potential to considerably more than the mere $130 billion paint industry estimate above. The present notch overcoating invention illustrated in FIG. 28 further extends applications to paints and inks and photos by, in effect, creating "notched paints and notched inks" similar to notch-filtered thin films and notched light sources previously discussed and illustrated in FIGS. 11 and 12. To be more concise, the narrowband absorption dyes discussed herein may be mixed directly into paints, coatings, and inks, or preferably, the narrowband absorption dyes may be applied as a very thin coating final overcoat on decorative or protective paints or overcoats on inks or photographs.

FIG. 28 illustrates a very thin narrowband absorption over-coating at 474 applied to a paint or ink or color photograph at 476 on a substrate such as wood or metal or paper 478. Very thin narrowband notch filter overcoats 474 on paints and inks can produce profound impacts on both normal vision and colorblind people—and with no need of eyewear or special lighting whatsoever. In the preferred top overcoat embodiment of the invention illustrated at 474 in FIG. 28, narrowband absorption dyes are applied as a very thin overcoat on paints, inks, or photographs. As will be understood by those skilled in optical spectroscopy, white light that falls onto colorful paints or inks must traverse the narrowband dye overcoat two times before light reaches a human eye. In other words, incident white light must first pass through the narrowband notch overcoat dye 474, followed by incidence onto the top surface of a paint or ink layer 476, where some of wavelengths of the white light are absorbed and others are reflected back by the paint or ink through the same thin narrowband thin overcoating for a second time before it is viewed by an observer. Thus, it is clear to those skilled in these arts, that such an outer surface double pass narrowband dye overcoating will exhibit twice the effective narrowband wavelength absorption of a single pass narrowband absorption, and thus, require lower narrowband dye concentrations to create a narrowband absorption notched paint or ink.

For example, an exceptionally thin coating of a narrowband absorption dye having a peak wavelength of 560 nm or 580 nm overcoated on a green or a red painted object such as a vehicle will have a profound impact on a colorblind person. Prior art green or red painted vehicles would normally be viewed by colorblind people as olive or tan colored vehicles, as illustrated in FIGS. 3A and 3B, where the real green and red colors are illustrated in FIG. 3B. But, if vehicle paints were overcoat notch filtered in accordance with this invention as illustrated at 474, a colorblind person would see very green or very red vehicles that the person has never experienced before. Similar thin notch overcoated colorful billboards, road-signs, photographs, or advertisements would stun millions of colorblind people like nothing before . . . again, requiring no eyewear. Likewise, colorful printed books/magazines, color newspapers, photographs, and the like, would also be viewed by millions of colorblind people as new green and red colors never seen before. Such thin narrowband notch over-coatings would also impact normal vision people with more vivid color paints and inks than ever before. Such profound vision impacts can be employed to help sell more printed products (books/magazines etc), and help advertisers sell more appealing colored products.

As described above with respect to FIGS. 15-17, a novel and preferred colorblindness-compensating LED lighting approach is possible, as illustrated in FIG. 29 in which a plastic helmet at 480 covers a conventional light emitting diode (LED) light source such as a lightbulb 484. The helmet consists of an optically transparent substrate incorporating at least one suitable narrow band absorption dye. As previously discussed, FIG. 15 depicts a typical array of individual narrowband emission wavelengths for LED lamps, while FIG. 16 depicts narrowband red, green and blue emission wavelengths 120, 122, and 124, respectively, for original LED quasi white light sources. FIG. 17 depicts an output waveform 130 representing more recent multi-phosphor coated highly efficient blue LEDs which stimulate a blue to red continuum of LED light to produce a near-continuum white light, which more closely approximates the ultimate solar spectrum continuum. The LED lightbulb 482 is coated or covered with a thin film having an absorption notch filter dye with an absorption characteristic illustrated by narrow band 132 in FIG. 17 to correct residential, commercial, and workplace colorblindness. The illustrated LED notch filter 480 can take the form of a liquid-dipped thin film or one of several elastic or rubbery thin film sheaths embedded with one or more of the narrowband absorption dyes previously cited.

Incandescent and fluorescent light sources which produce a white light spectral continuum of illumination can also be "notch-filtered" as described with respect to FIGS. 11 and 12 and illustrated in FIG. 30. This Figure illustrates a common tubular fluorescent light source, or bulb 486 which includes a thin plastic film 484 that has been pre-doped with at least one narrowband absorption dye, of the type previously described. The film is interposed between the light source and ambient, and thus may be wrapped around and affixed to the tubular lamp. The narrow band dye allows most of the light continuum from the incandescent or fluorescent light source to be present for indoor lighting—minus a small notch of green-yellow (~560 nm) light. Such filtered artificial lighting would appear slightly bluer with richer greens and reds to people of normal vision, but most colorblind people would not suffer indoor artificial light colorblindness. According to the present invention, artificial light sources, such as lightbulbs, would be either covered or solvent-coated with a FIG. 14 notch-filter to correct indoor artificial lighting colorblindness.

The sculpted multi-narrowband spectral wavelength examples provided herein can all be readily shifted to shorter or longer wavelengths to obtain individualized optimal high contrast net transmission hues without departing from the spirit of the present invention. As has been pointed out, no one narrow band chemical dye is known to possess multiple narrowband transmission bands capable of meeting the color vision objectives of the present invention. Further, those familiar with these spectral arts know that higher or lower dye concentrations produce higher or lower spectral absorption plus wider or narrower bandwidths—all of which properties are contemplated in the present multiple sharp transition, narrowband invention. In the spirit of the present invention, specific dyes and specific preferred dye wavelengths can be varied to shorter or longer wavelengths, with much higher or lower concentration, including larger numbers of individual narrowband dyes, without materially departing from the spirit of the present invention.

It will be understood that the foregoing description of preferred embodiments of the invention are exemplary and that numerous variations and combinations may be made without departing from the spirit and scope of the invention, which is limited only by the following claims.

What is claimed is:

1. Apparatus for enhancement of color vision and/or focal acuity, comprising:
   an optically transparent substrate;
   a visible light absorption dye within said substrate to provide a modified substrate, said modified substrate having an absorption bandwidth of about 60 nm at a selected peak wavelength, wherein the absorption bandwidth does not change due to angle of incidence of visible light, said modified substrate exhibiting bandwidth spectral absorption transitions to spectrally sculpt the transmission characteristics of said substrate in a selected spectral range of incident light to produce at least one desired transmitted or attenuated band of visible light to alleviate colorblindness, to sharpen retinal images, and/or to exaggerate color contrast vision.

2. The apparatus of claim 1, wherein said substrate is an optically transparent thin film and further includes a mixture of absorption dyes, the light transmitted through the modified substrate does not change color due to the angle of incidence of visible light and selected to produce in said thin film spectral transmission characteristics in a selected spectral range of incident light to produce at least one desired transmitted or attenuated band of visible light to enhance outdoor-viewing window color contrast and indoor enhanced color contrast illumination.

3. The apparatus of claim 2, further comprising multiple absorption dyes within said substrate, each of said dyes providing an absorption waveform having a different selected peak wavelength and spectral absorption transition at selected wavelengths to provide an optical absorption bandwidth of approximately 20 to 60 nanometers, said dyes combining to spectrally sculpt multiple selected transmitted bands of visible light.

4. The apparatus of claim 3, wherein said absorption dyes combine to provide selected peak wavelength transmission bands centered at about 450 nm, 530 nm, and 600 nm and a light wavelength absorption bands centered at about 560-580 nm, each dye providing an optical absorption bandwidth of approximately 20 to 60 nanometers to enhance visual acuity.

5. The apparatus of claim 3, wherein the substrate is a thin film interposed between a light source and a viewer, the thin film including window shades for sources of natural light and coverings for sources of artificial white light.

6. The apparatus of claim 1, wherein said substrate is a thin film adapted to surround a light emitter.

7. The apparatus of claim 1, wherein said dye is on or within said substrate, said modified substrate having a peak absorption wavelength for incident visible light centered at about 560 mn and having spectral transition slopes from the peak wavelength that provide an absorption bandwidth of about 20 nm to 60 nm to spectrally sculpt transmitted or reflected light to alleviate colorblindness, to enhance color contrast vision, to selectively notch-attenuate transmitted or reflected light, and/or to sharpen visual focus and acuity.

8. The apparatus of claim 1, wherein said dye is a single visible light absorption dye selected to provide a peak absorption wavelength to compensate for colorblindness caused by overlapping red and green cone sensitivities in a human retina, the selected dye absorbing a band of selected visible light wavelengths incident on cones within overlapping retinal wavelengths of the retina.

9. The apparatus of claim 1, further comprising:
   an incandescent, fluorescent, or LED source at visible wavelengths,
   wherein the modified substrates provides a visible light filter for said light source, said filter incorporating multiple absorption dyes to provide visible light absorption and transmission characteristics which do not change due to the angle of incidence of light from said source, and which provide wavelength peaks and transitions from the peaks to provide visible light bandwidth absorption characteristics to produce an emitted light spectrum from the filter having spectral notches at selected wavelengths.

10. The apparatus of claim 1, wherein the the visible light absorption dye is a mixture of absorption dyes,
    each providing a different selected peak absorption wavelength and each providing an absorption bandwidth of about 60 nm, and
    wherein said mixture of absorption dyes provides a transmitted band of spectrally sculpted visible light at about 540 nm to increase visual acuity.

11. The apparatus of claim 10, wherein the mixture includes a first absorption dye or a group of dyes to provide a first maximum spectral absorption bandwidth from about 540 nm to about 700 nm;
    a second absorption dye or group of dyes to provide a second maximum spectral absorption bandwidth from about 540 nm to about 400 nm, said first and second dyes or group of dyes combine to produce one spectral transmission band centered at about 540 nm to produce substantially chromatic aberration-free retinal images.

12. The apparatus of claim 10, wherein
    the multiple absorption dyes provide three light wavelength transmission bands centered at about 450 nm, 530 nm, and 600 nm, together producing enhanced color vision and alleviating colorblindness.

13. The apparatus of claim 1, wherein
    the modified substrate is suitable for imposition between a source of visible light and a human eye for absorbing impinging incident light, the modified substrate having an absorption bandwidth of about 20 nm-60 nm around a selected nominal peak wavelength of incident light.

14. The apparatus of claim 13, further comprising multiple nonreflective absorption dyes, each providing an absorption bandwidth of about 20 nm-60 nm around a selected different nominal peak wavelength of incident light and selected to produce multiple transmitting or absorbing bands in said visible light.

15. The apparatus of claim 1, wherein said modified substrate comprises an eyewear.

16. The apparatus of claim 15, wherein the eyewear comprises eyeglass lenses or contact lenses.

17. The apparatus of claim 1, wherein said modified substrate comprises a lens.

18. The apparatus of claim 1, wherein said modified substrate forms a filter for a source of direct or reflected visible light.

* * * * *